United States Patent
Gao et al.

(10) Patent No.: US 12,101,795 B2
(45) Date of Patent: Sep. 24, 2024

(54) MULTI-TRP COMMUNICATION

(71) Applicant: NEC CORPORATION, Tokyo (JP)

(72) Inventors: Yukai Gao, Beijing (CN); Gang Wang, Beijing (CN)

(73) Assignee: NEC Corporation (JP)

( * ) Notice: Subject to any disclaimer, the term of this patent is extended or adjusted under 35 U.S.C. 154(b) by 594 days.

(21) Appl. No.: 17/265,286

(22) PCT Filed: Aug. 3, 2018

(86) PCT No.: PCT/CN2018/098674
§ 371 (c)(1),
(2) Date: Feb. 2, 2021

(87) PCT Pub. No.: WO2020/024297
PCT Pub. Date: Feb. 6, 2020

(65) Prior Publication Data
US 2021/0337548 A1    Oct. 28, 2021

(51) Int. Cl.
*H04W 72/53* (2023.01)
*H04L 5/00* (2006.01)
(Continued)

(52) U.S. Cl.
CPC ......... *H04W 72/53* (2023.01); *H04L 5/0051* (2013.01); *H04W 72/0446* (2013.01); *H04W 72/0453* (2013.01); *H04W 72/23* (2023.01)

(58) Field of Classification Search
CPC ............................ H04L 5/0048; H04B 7/0626
(Continued)

(56) References Cited

U.S. PATENT DOCUMENTS

2019/0140801 A1* 5/2019 Ko ..................... H04L 27/26035
2020/0178222 A1* 6/2020 Wang ................... H04L 5/0044
(Continued)

FOREIGN PATENT DOCUMENTS

| CN | 108199819 A | 6/2018 |
| CN | 108259401 A | 7/2018 |
| WO | 2019/215888 A1 | 11/2019 |

OTHER PUBLICATIONS

ZTE, Sanechips, "Details and evaluation results on beam indication", 3GPP TSG RAN WG1 Meeting #91, R1-1719538, 11 pages.
(Continued)

*Primary Examiner* — Kiet M Doan
(74) *Attorney, Agent, or Firm* — NEC-IPC

(57) ABSTRACT

Embodiments of the present disclosure provide methods, devices and computer readable media for multi-TRP transmission. According to a method for communication, a terminal device receives downlink control information (DCI) from at least one of a plurality of network devices in communication with the terminal device, each of the plurality of network devices having a different demodulation reference signal (DMRS) group comprising a plurality of DMRS ports for transmitting DMRSs. The terminal device determines, from the DCI, respective transmission configuration indication (TCI) states for DMRS groups of the plurality of network devices and DMRS ports for receiving DMRSs transmitted by the plurality of network devices. The terminal device receives the DMRSs from the plurality of network devices on the DMRS ports based on the TCI states. The embodiments of the present disclosure provide solution of multi-TRP communication with reduced overhead.

20 Claims, 5 Drawing Sheets

(51) Int. Cl.
*H04W 72/0446* (2023.01)
*H04W 72/0453* (2023.01)
*H04W 72/23* (2023.01)

(58) Field of Classification Search
USPC ........................................ 370/280, 329, 330
See application file for complete search history.

(56) References Cited

U.S. PATENT DOCUMENTS

| 2021/0029647 | A1* | 1/2021 | Matsumura | ............ | H04W 52/18 |
| 2021/0036746 | A1* | 2/2021 | Liu | ....................... | H04B 7/0456 |
| 2021/0250981 | A1* | 8/2021 | Takeda | .............. | H04W 72/1273 |
| 2021/0259004 | A1* | 8/2021 | Takeda | ....................... | H04L 1/08 |

OTHER PUBLICATIONS

Extended European Search Report dated Jun. 22, 2021, issued by the European Patent Office in application No. 18928417.7.
Japanese Office Action for JP Application No. 2021-505854 mailed on Apr. 26, 2022 with English Translation.
Huawei et al., "TP for single-PDCCH NCJT in Rel-15", 3GPP TSG RAN WG1 Meeting #92, R1-1802542, Mar. 2, 2018, 3pages.
Nokia et al., "Offline discussion summary on QCL", 3GPP TSG RAN WG1#92bis, R1-1805690, Apr. 20, 2018, 20pages.
QUALCOMM Incorporated et al., "Remaining Details on QCL", 3GPP TSG RAN WG1 Meeting #92, R1-1802832, Mar. 2, 2018, 13pages.
ZTE et al., "Remaining Details on PT-RS", 3GPP TSG RAN WG1 Meeting #91, R1-1719543, Dec. 1, 2017, 8pages.
International Search Report for PCT/CN2018/098674 dated May 5, 2019 [PCT/ISA/210].
Written Opinion for PCT/CN2018/098674 dated May 5, 2019 [PCT/ISA/237].
Japanese Office Action for JP Application No. 2021-505854, mailed on Sep. 27, 2022 with English Translation.
Huawei, HiSilicon, "Details of QCL assumptions and related RS design considerations"[online], 3GPP TSG RAN WG1 #90bis, R1-1717309, Oct. 12, 2017, Prague, Czech Republic.
JP Official Communication for Japanese Patent Application No. 2023-034367, mailed on Apr. 2, 2024 with English Translation.
Nokia, Nokia Shanghai Bell, "Remaining Issue on DMRS Port Mapping and its Impact on CCQI/MCS", 3GPP TSG RAN WG1 #92b R1-1805100, Apr. 20, 2018.
AT&T, "Remaining Issues for MIMO Codeword Mapping", 3GPP TSG RAN WG1 #92b R1-1804654, Apr. 20, 2018, pp. 1-8.

* cited by examiner

MULTI-TRP COMMUNICATION

FIELD

Embodiments of the present disclosure generally relate to wireless communication, and in particular, to a method, a device and a computer readable medium for multi-TRP communication.

BACKGROUND

The latest developments of the 3GPP standards are referred to as Long Term Evolution (LTE) of Evolved Packet Core (EPC) network and Evolved UMTS Terrestrial Radio Access Network (E-UTRAN), also commonly termed as '4G'. In addition, the term '5G New Radio (NR)' refers to an evolving communication technology that is expected to support a variety of applications and services. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard.

Recently, the study of NR system was approved. The NR will consider frequency ranges up to 100 GHz with the objective of a single technical framework addressing all defined usage scenarios, requirements and deployment scenarios, including enhanced mobile broadband, massive machine-type-communications, and ultra-reliable and low latency communications. Discussion of multi-antenna scheme for new radio access has been started, including multi-antenna scheme, beam management, channel state information (CSI) acquisition, and reference signal and quasi co-located (QCL). Also, single-TRP transmission and multi-TRP transmission have been agreed in NR. However, multi-TRP/panel transmission is down-prioritized in current study, and will be discussed in future developments.

SUMMARY

In general, example embodiments of the present disclosure provide methods, devices
and computer readable media for multi-TRP communication.

In a first aspect, there is provided a method for communication. The method comprises receiving, at a terminal device, downlink control information (DCI) from at least one of a plurality of network devices in communication with the terminal device, each of the plurality of network devices having a different demodulation reference signal (DMRS) group comprising a plurality of DMRS ports for transmitting DMRSs. The method also comprises determining, from the DCI, respective transmission configuration indication (TCI) states for DMRS groups of the plurality of network devices and DMRS ports for receiving DMRSs transmitted by the plurality of network devices. The method further comprises receiving, on the DMRS ports and based on the TCI states, the DMRSs from the plurality of network devices.

In a second aspect, there is provided a method for communication. The method comprises determining, at a network device of a plurality of network devices in communication with a terminal device, TCI states for respective DMRS groups of the plurality of network devices and DMRS ports for the plurality of network devices transmitting DMRSs to the terminal device. Each of the DMRS groups comprises a plurality of DMRS ports. The method also comprises generating DCI indicating the TCI states and the DMRS ports. The method further comprises transmitting the DCI to the terminal device, such that the terminal device receives the DMRSs from the plurality of network devices on the DMRS ports based on the TCI states.

In a third aspect, there is provided a terminal device. The terminal device comprises a processor and a memory storing instructions. The memory and the instructions are configured, with the processor, to cause the terminal device to receive DCI from at least one of a plurality of network devices in communication with the terminal device. Each of the plurality of network devices has a different DMRS group comprising a plurality of DMRS ports for transmitting DMRSs. The memory and the instructions are also configured, with the processor, to cause the terminal device to determine, from the DCI, respective TCI states for DMRS groups of the plurality of network devices and DMRS ports for receiving DMRSs transmitted by the plurality of network devices. The memory and the instructions are further configured, with the processor, to cause the terminal device to receive, on the DMRS ports and based on the TCI states, the DMRSs from the plurality of network devices.

In a fourth aspect, there is provided a network device. The network device comprises a processor and a memory storing instructions. The memory and the instructions are configured, with the processor, to cause the network device to determine TCI states for respective DMRS groups of a plurality of network devices comprising the network device in communication with a terminal device, and DMRS ports for the plurality of network devices transmitting DMRSs to the terminal device. Each of the DMRS groups comprises a plurality of DMRS ports. The memory and the instructions are also configured, with the processor, to cause the network device to generate DCI indicating the TCI states and the DMRS ports. The memory and the instructions are further configured, with the processor, to cause the network device to transmit the DCI to the terminal device, such that the terminal device receives the DMRSs from the plurality of network devices on the DMRS ports based on the TCI states.

In a fifth aspect, there is provided a computer readable medium having instructions stored thereon. The instructions, when executed on at least one processor of a device, cause the device to carry out the method according to the first aspect.

In a sixth aspect, there is provided a computer readable medium having instructions stored thereon. The instructions, when executed on at least one processor of a device, cause the device to carry out the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
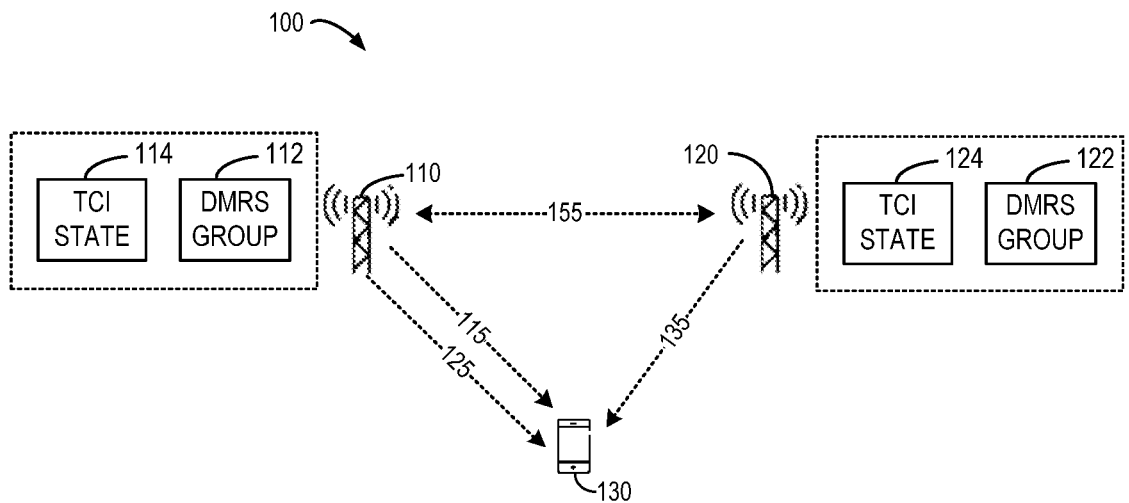
FIG. 1 is a schematic diagram of a communication environment in which some embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "transmission/reception point" may generally indicate a station communicating with the user equipment. However, the transmission/reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission/reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a base station. Alternatively, a downlink (DL) transmission/reception is a scheme in which data is transmitted from the base station to the user equipment.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 is a schematic diagram of a communication environment 100 in which some embodiments of the present disclosure can be implemented. In the communication environment 100, there are two network devices 110, 120 and a terminal device 130. The terminal device 130 may communicate with one or both of the network devices 110, 120 via wireless communication links. In some embodiments, the network devices 110 and 120 may be two base stations serving the terminal device 130 cooperatively. In this case, the network devices 110 and 120 may communicate with each other via a communication link 155. In some other embodiments, the network devices 110 and 120 may be different transmission/reception units of one base station serving the terminal device 130. In some further embodiments, the network devices 110 and 120 may be two TRPs or two panels or two cells or two groups of antenna ports/elements within one TRP/panel/cell. As used herein, the wireless communication involving a plurality of network devices in communication with a terminal device (such as the communication environment 100) may also be referred to as multi-TRP communication.

It is to be understood that the number of network devices and the number of terminal devices as shown in FIG. 1 are only for the purpose of illustration without suggesting any limitations. Actually, the communication environment 100 may include any suitable number of network devices and any suitable number of terminal devices adapted for implementing embodiments of the present disclosure.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As mentioned above, the terminal device 130 may communicate with one or both of the network devices 110, 120 via transmissions on the forward and reverse links. As used herein, the forward link (or downlink) refers to the communication link from the access networks to the terminals, and the reverse link (or uplink) refers to the communication link from the terminals to the access networks.

In a wireless communication system illustrated by the communication environment 100, a demodulation reference signal (DMRS) may be a type of reference signals that provides modulation/demodulation information related to a communication channel (e.g., physical downlink control channel (PDCCH) and/or physical downlink shared channel (PDSCH)) for accurate or coherent decoding of information transmitted via the communication channel.

In transmission of DMRSs, the network devices 110 and 120 may allocate corresponding resources (also referred to as "DMRS resources") for the transmission and/or specify which DMRS sequence is to be transmitted. In some scenarios, both the network devices 110, 120 and the terminal device 130 are equipped with multiple antenna ports (or antenna elements) and can transmit specified RS sequences with the antenna ports (antenna elements).

A set of DMRS resources associated with a number of DMRS ports may also be specified. A DMRS port may be referred to as a specific mapping of part or all of a DMRS sequence to one or more resource elements (REs) of a resource region allocated for RS transmission in time, frequency, and/or code domains. Such resource allocation information as well as other necessary information may be indicated to the terminal device 130 prior to the transmission of the DMRSs. For example, the DMRS configurations can be transmitted via higher layer signalling (such as Radio Resource Control (RRC) and/or Medium Access Control (MAC) Control Element (CE)) and/or dynamic signalling (such as downlink control information (DCI)) to the terminal device.

In some embodiments, a quasi-co-location (QCL) type may be configured for Physical Downlink Shared Channel (PDSCH) and/or the reference signals. Examples of the RS may include but are not limited to downlink or uplink Demodulation Reference Signal (DMRS), CSI-RS, SRS, Phase Tracking Reference Signal (PTRS), Tracking Reference Signal (TRS), fine time-frequency Tracking Reference Signal (TRS), CSI-RS for tracking, Synchronization Signal (SS)/Physical Broadcast Channel (PBCH) block, SS block (SSB) and so on. For example, the QCL type may be at least one of the following: 'QCL-TypeA': {Doppler shift, Doppler spread, average delay, average spread}; 'QCL-TypeB': {Doppler shift, Doppler spread}; 'QCL-TypeC': {Doppler shift, average delay}; and 'QCL-TypeD': {Spatial Rx parameter}.

As shown in FIG. 1, the network device 110 may transmit DMRSs 125 to the terminal device 130, and the network device 120 may transmit DMRSs 135 to the terminal device 130. For transmitting DMRSs 125, 135 to the terminal device 130, the network devices 110 and 120 may have their respective DMRS groups 112 and 122. The network device 110 may select the DMRS ports for transmitting the DMRSs 125 from the DMRS group 112, and the network devices 120 may select the DMRS ports for transmitting the DMRSs 135 from the DMRS group 122. In some embodiments, a DMRS group may refer to a group of DMRS ports for transmitting DMRSs. DMRS ports in one DMRS group may be quasi co-located (QCL) with each other.

In some embodiments, a number of codewords may be configured for a terminal device. For example, the number may be 1 or 2. For example, the number of codewords may be configured by signaling in Radio Resource Control (RRC) and/or Medium Access Control (MAC) and/or Physical Layer (PHY).

In some embodiments, a set of parameters for DMRS configuration may be configured for a terminal device. The set of parameters may include at least one of the maximum number/length of the symbols for DMRS, a type of DMRS, and etc. For example, the set of parameters may be configured by signaling in Radio Resource Control (RRC) and/or Medium Access Control (MAC) and/or Physical Layer (PHY).

In some embodiments, the maximum number/length (for example, the maximum number/length is M) of symbols for DMRS may be the maximum number of symbols for each DMRS transmission occasion in one PDSCH transmission duration, and one DMRS transmission occasion may be the DMRS transmission in K consecutive symbols. For example, M may be 1 or 2 or 3 or 4. For example, K may be 1 or 2 or 3 or 4, and K is no greater than M. In some embodiments, the maximum number/length (for example, the maximum number/length is M) of symbols for DMRS may be the maximum number of symbols for the front-loaded DMRS, where the front-loaded DMRS is the first DMRS transmission occasion in K consecutive symbols in one PDSCH transmission duration. For example, M may be 1 or 2 or 3 or 4. For example, K may be 1 or 2 or 3 or 4, and K is no greater than M.

In some embodiments, the type of DMRS may be the DMRS configuration pattern in time and/or frequency domain. There are up to two types of DMRS can be configured for a terminal device (for example, DMRS type 1 and/or DMRS type 2). In some embodiments, DMRS type 1 can include up to 8 DMRS ports (for example, when the maximum number/length of DMRS is 2). The DMRS ports are multiplexed with at least one of FDM (frequency domain multiplexing), CDM (code domain multiplexing) in frequency domain and CDM in time domain. In some embodiments, DMRS type 1 can include up to 4 DMRS ports (for example, when the maximum number/length of DMRS is 1). The DMRS ports are multiplexed with at least one of FDM and CDM in frequency domain.

In some embodiments, DMRS type 2 can include up to 12 DMRS ports (for example, when the maximum number/length of DMRS is 2). The DMRS ports are multiplexed with at least one of FDM (frequency domain multiplexing), CDM (code domain multiplexing) in frequency domain and CDM in time domain. In some embodiments, DMRS type 2 can include up to 6 DMRS ports (for example, when the maximum number/length of DMRS is 1). The DMRS ports are multiplexed with at least one of FDM and CDM in frequency domain.

In some embodiments, if DMRS ports are multiplexed only with CDM in time and/or frequency domain, the DMRS ports are QCLed with each other with respect to {Doppler shift, Doppler spread, average delay, average spread, Spatial Rx parameter} and/or average gain. Alternatively, the DMRS ports are QCLed with each with respect to QCL-TypeA and QCL-TypeD and/or average gain.

In some embodiments, G DMRS groups may be configured for a terminal device. For example, G may be 1 or 2 or 3 or 4. For example, the G DMRS groups may be configured by signaling in Radio Resource Control (RRC) and/or Medium Access Control (MAC) and/or Physical Layer (PHY). In some embodiments, in DCI scheduling the downlink transmission, one TCI state should be configured for each DMRS group. That is, up to G TCI states should be configured in one DCI. For example, the G TCI states may be same or different.

In some embodiments, the DMRS ports within different DMRS groups should be multiplexed with FDM and/or TDM (time domain multiplexing). In some embodiments, for DMRS type 1, the maximum 8 DMRS ports may be {0,1,2,3,4,5,6,7}. DMRS ports {0,1,4,5} are multiplexed with CDM in frequency domain and/or CDM in time domain, DMRS ports {0,1,4,5} should be QCLed with each other with respect to {Doppler shift, Doppler spread, average delay, average spread, Spatial Rx parameter} and/or average gain, and DMRS ports {0,1,4,5} should be within one DMRS group. DMRS ports {2,3,6,7} are multiplexed with CDM in frequency domain and/or CDM in time domain, DMRS ports {2,3,6,7} should be QCLed with each other with respect to {Doppler shift, Doppler spread, average delay, average spread, Spatial Rx parameter} and/or average gain, and DMRS ports {2,3,6,7} should be within one DMRS group.

In some embodiments, as an example of grouping of the DMRS ports, for DMRS type 1 as defined in 3GPP specifications, up to 2 DMRS groups (DMRS group $G_1$ and/or DMRS group $G_2$) may be configured. For example, if two DMRS groups are configured, DMRS group $G_1$ may include at least one DMRS port from {0,1,4,5}, and DMRS group $G_2$ may include at least one DMRS port from {2,3,6,7}. For another example, if only one DMRS group is configured, there is only one DMRS group $G_1$ or DMRS group $G_2$, and DMRS group $G_1$ or DMRS group $G_2$ may include at least one DMRS port from {0,1,2,3,4,5,6,7}.

In some embodiments, the DMRS ports within different DMRS groups should be multiplexed with FDM and/or TDM (time domain multiplexing). In some embodiments, for DMRS type 2, the maximum 12 DMRS ports may be {0,1,2,3,4,5,6,7,8,9,10,11}. DMRS ports {0,1,6,7} are multiplexed with CDM in frequency domain and/or CDM in time domain, DMRS ports {0,1,6,7} should be QCLed with each other with respect to {Doppler shift, Doppler spread, average delay, average spread, Spatial Rx parameter} and/or average gain, and DMRS ports {0,1,6,7} should be within one DMRS group. DMRS ports {2,3,8,9} are multiplexed with CDM in frequency domain and/or CDM in time domain, DMRS ports {2,3,8,9} should be QCLed with each other with respect to {Doppler shift, Doppler spread, average delay, average spread, Spatial Rx parameter} and/or average gain, and DMRS ports {2,3,8,9} should be within one DMRS group. DMRS ports {4,5,10,11} are multiplexed with CDM in frequency domain and/or CDM in time domain, DMRS ports {4,5,10,11} should be QCLed with each other with respect to {Doppler shift, Doppler spread, average delay, average spread, Spatial Rx parameter} and/or average gain, and DMRS ports {4,5,10,11} should be within one DMRS group.

In some embodiments, as an example of grouping of the DMRS ports, for DMRS type 2 as defined in 3GPP specifications, up to 2 DMRS groups (DMRS group $G_1$ and/or DMRS group $G_2$) may be configured. For example, if two DMRS groups are configured, DMRS group $G_1$ may include at least one DMRS port from {0,1,6,7, 4,5,10,11}, and DMRS group $G_2$ may include at least one DMRS port from {2,3,8,9}. For another example, if two DMRS groups are configured, DMRS group $G_1$ may include at least one DMRS port from {0,1,6,7}, and DMRS group $G_2$ may include at least one DMRS port from {2,3,8,9, 4,5,10,11}. For another example, if two DMRS groups are configured, DMRS group $G_1$ may include at least one DMRS port from {0,1,6,7,2,3,8,9}, and DMRS group $G_2$ may include at least one DMRS port from {4,5,10,11}. For another example, if only one DMRS group is configured, there is only one DMRS group $G_1$ or DMRS group $G_2$, and DMRS group $G_1$ or DMRS group $G_2$ may include at least one DMRS port from {0,1,2,3,4,5,6,7,8,9,10,11}.

In some embodiments, as an example of grouping of the DMRS ports, for DMRS type 2 as defined in 3GPP specifications, three DMRS groups (DMRS group $G_1$, DMRS group $G_2$, and DMRS group $G_3$) may be configured. For example, if three DMRS groups are configured, DMRS group $G_1$ may include at least one DMRS port from {0,1,6,7}, DMRS group $G_2$ may include at least one DMRS port from {2,3,8,9}, and DMRS group $G_3$ may include at least one DMRS port from {4,5,10,11}.

In some embodiments, for DMRS type 1 or DMRS type 2 as defined in 3GPP specifications, two DMRS groups (DMRS group $G_1$ and/or DMRS group $G_2$) are configured. In some embodiments, the DMRS ports from DMRS group $G_1$ and the DMRS ports from DMRS group $G_2$ may be QCLed with each other with respect to QCL-TypeB or with respect to {Doppler shift, Doppler spread}. In some embodiments, the DMRS ports from DMRS group $G_1$ and the DMRS ports from DMRS group $G_2$ may not be QCLed with each other with respect to any one of QCL-Type A, QCL-TypeB, QCL-TypeC and QCL-TypeD. In some embodiments, the DMRS ports from DMRS group $G_1$ and the DMRS ports from DMRS group $G_2$ may be QCLed with each other with respect to {Doppler shift, Doppler spread, average delay, average spread, Spatial Rx parameter} and/or average gain. Alternatively, the DMRS ports from DMRS group $G_1$ and the DMRS ports from DMRS group $G_2$ may be QCLed with each other with respect to QCL-Type A and QCL-TypeD.

In current specifications, there may be a TCI field in downlink control information (DCI), and a terminal device may be configured with a TCI state, and the TCI state may contain parameters for configuring a QCL relationship between one or two downlink reference signals and the DMRS ports of the PDSCH. The terminal device may be configured with a DMRS type and/or a maximum number/length of DMRS and/or the number of codewords. If the terminal device is configured with a given DMRS type, a given value of the maximum number/length of DMRS, and a given value of the number of codewords, there is one corresponding table for indication of at least one of antenna ports, the number of DMRS CDM group(s) without data, the number of front-loaded DMRS symbols, the number of DMRS port(s), and the index(es) for DMRS port(s).

For different types of DMRS and/or different values of the maximum number/length of DMRS and/or a different number of codewords, the corresponding tables may be different, where the table is configured for indication of at least one of antenna ports, the number of DMRS CDM group(s) without data, the number of front-loaded DMRS symbols, the number of DMRS port(s), and the index(es) for DMRS port(s). For a given corresponding table and a given number of codewords and for different values/indexes in the table, at least one of the number of DMRS CDM group(s) without data, the number of front-loaded DMRS symbols, the number of DMRS port(s) and the index(es) for DMRS port(s) is different.

In some embodiments, if more than one (for example, two) DMRS groups are configured for a terminal device, there may be one or two TCI states configured in one DCI for the terminal device. In some embodiments, the number of the TCI states in one DCI depends on the QCL relationship between the DMRS ports from the two DMRS groups. For example, if the DMRS ports from the two DMRS groups are not QCLed with each other with respect to at least one of QCL-TypeA, QCL-TypeB, QCL-TypeC and QCL-TypeD, the number of TCI states in one DCI may be 2. For another example, if the DMRS ports from the two DMRS groups are QCLed with each other with respect to {Doppler shift, Doppler spread, average delay, average spread, Spatial Rx parameter} and/or average gain, the number of TCI states in one DCI may be 1.

In some embodiments, the number of the TCI states in one DCI depends on the number of DMRS ports. For example, if the number of DMRS ports is 2, the number of TCI states in one DCI may be 2. For example, the two TCI states in one DCI may be same or different from each other. For another example, if the number of DMRS ports is 1, the number of TCI states in one DCI may be 1.

In some embodiments, a terminal device may be configured with a DMRS type and/or a maximum number/length of DMRS and/or a number of codewords. If the terminal device is configured with a given DMRS type, a given value of the maximum number/length of DMRS and a given number of codewords, the corresponding tables may be different based on a different number of TCI states in one DCI, where the table is configured for indication of at least one of antenna ports, the number of DMRS CDM group(s) without data, the number of front-loaded DMRS symbols, the number of DMRS port(s), and the index(es) for DMRS port(s).

For example, when the number of TCI states in one DCI is 1, for a given DMRS type, a given value of the maximum number/length of DMRS and a given number of codewords, the corresponding table for indication of at least one of antenna ports, the number of DMRS CDM group(s) without data, the number of front-loaded DMRS symbols, the number of DMRS port(s), and the index(es) for DMRS port(s) may be Table P. For example, Table P is as defined in current 3GPP specifications. For another example, when the number of TCI states in one DCI is 2, for a given DMRS type, a given value of the maximum number/length of DMRS and a given number of codewords, the corresponding table for indication of at least one of antenna ports, the number of DMRS CDM group(s) without data, the number of front-loaded DMRS symbols, the number of DMRS port(s), and the index(es) for DMRS port(s) may be Table Q.

In some embodiments, the numbers of values for Table P and Table Q may be different. In some embodiments, the numbers of bits for configuration of Table P and Table Q may be different. In some embodiments, for a given value of the number of DMRS CDM group(s) without data, a given number of DMRS port(s), a given index(es) for DMRS port(s), and/or a given value of the number of front-loaded DMRS symbols, there is only one indication in Table P. In some embodiments, for a given value of the number of DMRS CDM group(s) without data, a given number of DMRS port(s), a given index(es) for DMRS port(s), and/or a given value of the number of front-loaded DMRS symbols, there are more than one indication in Table Q.

For example, the more than one indication may indicate different TCI states. In some embodiments, there may be at least one index within Table P, where at least one of the indication of antenna ports, the number of DMRS CDM group(s) without data, the number of front-loaded DMRS symbols, the number of DMRS port(s), and the index(es) for DMRS port(s) indicated by the at least one index within Table P is different from at least one of the indication of antenna ports, the number of DMRS CDM group(s) without data, the number of front-loaded DMRS symbols, the number of DMRS port(s), and the index(es) for DMRS port(s) indicated by any index in Table Q.

In some embodiments, a terminal device may be configured with a DMRS type and/or maximum number/length of DMRS and/or the number of codewords. The terminal device may be configured with two TCI states in one DCI. If the terminal device is configured with a given DMRS type, a given value of the maximum number/length of DMRS and a given number of codewords, the corresponding tables may be different based on the values of the two TCI states in one DCI, where the table is configured for indication of at least one of antenna ports, the number of DMRS CDM group(s) without data, the number of front-loaded DMRS symbols, the number of DMRS port(s), and the index(es) for DMRS port(s).

In some embodiments, when the two TCI states in one DCI are same, for a given DMRS type, a given value of the maximum number/length of DMRS and a given number of codewords, the corresponding table for indication of at least one of antenna ports, the number of DMRS CDM group(s) without data, the number of front-loaded DMRS symbols, the number of DMRS port(s), and the index(es) for DMRS port(s) may be Table P. For example, Table P is as defined in current 3GPP specifications. In some embodiments, when the two TCI states in one DCI are different, for a given DMRS type, a given value of the maximum number/length of DMRS and a given number of codewords, the corresponding table for indication of at least one of antenna ports, the number of DMRS CDM group(s) without data, the number of front-loaded DMRS symbols, the number of DMRS port(s), and the index(es) for DMRS port(s) may be Table Q.

In some embodiments, the numbers of values for Table P and Table Q may be different. In some embodiments, the numbers of bits for configuration of Table P and Table Q may be different. In some embodiments, there may be at least one index within Table P, where at least one of the indication of antenna ports, the number of DMRS CDM group(s) without data, the number of front-loaded DMRS symbols, the number of DMRS port(s), and the index(es) for DMRS port(s) indicated by the at least one index within Table P is different from at least one of the indication of antenna ports, the number of DMRS CDM group(s) without data, the number of front-loaded DMRS symbols, the number of DMRS port(s), and the index(es) for DMRS port(s) indicated by any index in Table Q.

In some embodiments, when two TCI states (for example, TCI state #1 and TCI state #2) are configured in one DCI, and the two TCI states are different, for a given DMRS type, a given value of the maximum number/length of DMRS and a given number of codewords, the corresponding table for indication of at least one of antenna ports, the number of DMRS CDM group(s) without data, the number of front-loaded DMRS symbols, the number of DMRS port(s), and the index(es) for DMRS port(s) may be Table Q. In some embodiments, TCI state #1 is configured for DMRS group $G_1$. The TCI state #2 is configured for DMRS group $G_2$.

In some embodiments, the configuration of at least one of the number of DMRS CDM group(s) without data, the number of front-loaded DMRS symbols, the number of DMRS port(s) and the index(es) for DMRS port(s) within Table Q may have some restrictions. In some embodiments, the number of DMRS ports indicated by each indication/index/value within Table Q may be no less than 2. In some embodiments, the DMRS ports indicated by each indication/index/value within Table Q should be included in different DMRS groups. In some embodiments, for each indication/index/value in Table Q, there may be R DMRS ports configured for the indication/index/value. Within the R indication DMRS ports, at least two DMRS ports should be multiplexed with FDM. In some embodiments, if the number of DMRS ports for one indication/index/value within Table Q is 1, only the first TCI state is used for this DMRS port. That is, the second TCI state is ignored.

As an example of grouping of the DMRS ports, for DMRS type 1 as defined in 3GPP specifications, one DMRS group may include DMRS ports {0,1,4,5}, and another DMRS group may include DMRS ports {2,3,6,7}. As another example of grouping of the DMRS ports, for DMRS type 2 as defined in 3GPP specifications, one DMRS group may include DMRS ports {0,1,6,7}, another DMRS group may include DMRS ports {2,3,8,9}, and DMRS ports {4,5,10,11} can only be added in one group.

In other words, if the DMRS ports {4,5,10,11} are added in the former DMRS group, the first DMRS group includes DMRS ports {0,1,6,7,4,5,10,11} and another DMRS group includes DMRS ports {2,3,8,9}. If the DMRS ports {4,5,10,11} are added in the latter DMRS group, the first DMRS group includes DMRS ports {0,1,6,7} and another DMRS group includes DMRS ports {2,3,8,9,4,5,10,11}.

In addition, the DMRS groups 112 and 122 may have their respective Transmission Configuration Indication (TCI) states 114 and 124. In the following, the TCI states 114 and 124 may also be referred to as the TCI fields 114 and 124, if they are indicated by a respective TCI field. In general, a TCI state indicates a transmission configuration which includes QCL-relationships between the DL RSs in one RS set and the PDSCH DMRS ports. As used herein, possible TCI states of the TCI states 114 and 124 may referenced by capital letters, such as TCI states A-G.

As specified in the 3GPP specifications, if a UE is configured with the higher layer parameter tci-PresentInDCI that is set as 'enabled' for the CORESET scheduling the PDSCH, the UE assumes that the TCI field is present in the DCI format 1_1 of the PDCCH transmitted on the CORESET. If tci-PresentInDCI is not configured for the CORESET scheduling the PDSCH or the PDSCH is scheduled by a DCI format 1_0, for determining PDSCH antenna port quasi co-location, the UE assumes that the TCI state for the PDSCH is identical to the TCI state applied for the CORESET used for the PDCCH transmission.

If the tci-PresentInDCI is set as 'enabled', when the PDSCH is scheduled by DCI format 1_1, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold Threshold-Sched-Offset, where the threshold is based on reported UE capability.

In other words, in order for the terminal device 130 successfully receives the DMRSs 125 transmitted by the network device 110, the terminal device 130 needs to be informed of the selected DMRS ports for the network device 110 transmitting the DMRSs 125 and the TCI state 114 for the DMRS group 112. In general, the network device 110 may indicate the selected DMRS ports and the TCI state 114 to the terminal device 130 in Downlink Control Information (DCI) 115, which may be carried by PDCCH, for example.

More specifically, the PDCCH carries DCI to indicate the resource assignment in UL or DL for a terminal device, for example. A DCI can convey various pieces of information, but the useful content depends on the specific case of system deployment or operations. As indicated above, DCI format 1_1 includes a field of TCI, which is 0 bit if higher layer parameter tci-PresentInDCI is not enabled and otherwise 3 bits. In addition, DCI format 1_1 includes a field of antenna port(s) which is 4, 5, or 6 bits and which indicates the DMRS ports used by a network device. Table I-A as below shows an example of the field of antenna port(s) for DMRS type 1 and the maximum number/length of DMRS is 2. The number of bits is 5 bits.

TABLE I-A

Antenna port(s) (1000 + DMRS port), dmrs-Type = 1, maxLength = 2

| | One Codeword:<br>Codeword 0 enabled,<br>Codeword 1 disabled | | | Two Codewords:<br>Codeword 0 enabled,<br>Codeword 1 enabled | | |
| --- | --- | --- | --- | --- | --- | --- |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |

TABLE I-A-continued

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

Table I-B as below shows an example of the field of antenna port(s) for DMRS type 1 and the maximum number/length of DMRS is 1. The number of bits is 4 bits.

TABLE I-B

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

Table I-C as below shows an example of the field of antenna port(s) for DMRS type 2 and the maximum number/length of DMRS is 1. The number of bits is 5 bits.

TABLE I-C

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |

TABLE I-C-continued

Antenna port(s) (1000 + DMRS port), dmrs-Type = 2, maxLength = 1

| | One codeword:<br>Codeword 0 enabled,<br>Codeword 1 disabled | | | Two codewords:<br>Codeword 0 enabled,<br>Codeword 1 enabled | |
| --- | --- | --- | --- | --- | --- |
| Value | Number of DMRS CDM group(s) without data | DMRS port(s) | Value | Number of DMRS CDM group(s) without data | DMRS port(s) |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

Table I-D as below shows an example of the field of antenna port(s) for DMRS type 2 and the maximum number/length of DMRS is 2. The number of bits is 6 bits.

TABLE I-D

Antenna port(s) (1000 + DMRS port), dmrs-Type = 2, maxLength = 2

| | One codeword:<br>Codeword 0 enabled,<br>Codeword 1 disabled | | | | Two Codewords:<br>Codeword 0 enabled,<br>Codeword 1 enabled | | |
| --- | --- | --- | --- | --- | --- | --- | --- |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |

TABLE I-D-continued

Antenna port(s) (1000 + DMRS port), dmrs-Type = 2, maxLength = 2

| | One codeword:<br>Codeword 0 enabled,<br>Codeword 1 disabled | | | | Two Codewords:<br>Codeword 0 enabled,<br>Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

For example, for Table 1-A, if the value of the field of antenna port(s) is 5, the selected DMRS port is DMRS port 2, if the value of the field of antenna port(s) is 10, the selected DMRS ports are DMRS ports 0-3, and if the value of the field of antenna port(s) is 28, the selected DMRS ports are DMRS ports 0, 1, 4, and 5.

That is, a terminal device may determine the DMRS ports of the DMRSs from the field of antenna port(s) in DCI transmitted by a network device, and may determine the TCI state from the field of TCI (3 bits, if present). In conventional solutions, there are only one TCI field with 3 bits and one configurable DMRS indication field for one DMRS group, if multiple DMRS groups are introduced such as for multi-TRP communication, more TCI fields may be needed. For example, in the communication environment 100 as depicted in FIG. 1, the DCI 115 may need to be enhanced to indicate the selected DMRS ports and the TCI states 114, 124 for both the network devices 110 and 120. In order to solve the above technical problems and potentially other technical problems in conventional solutions, embodiments of the present disclosure provide methods, devise and computer readable media for multi-TRP communication. The embodiments of the present disclosure provide solution of multi-TRP communication with reduced overhead.

Principles and implementations of the present disclosure will be described in detail below with reference to FIG. 2, which shows a flowchart illustrating a process 200 of communication between network devices and a terminal device in accordance with some embodiments of the present disclosure. For the purpose of discussion, the process 200 will be described with reference to FIG. 1. In some embodiments, the process 200 may involve the network devices 110, 120 and the terminal device 130 in FIG. 1.

In the following, without loss of generality and for ease of discussion, the example embodiments are described with respect to a scenario involving two network devices or two TRPs or two panels 110 and 120. It is to be understood that the embodiments of the present disclosure may also apply to other scenarios involving three or more network devices. Further, although the example embodiments below are described as the network device 110 sending related indications to the terminal device 130, these indications may be sent by network device 120 or both of the network devices 110 and 120 in other embodiments.

Figure 2:
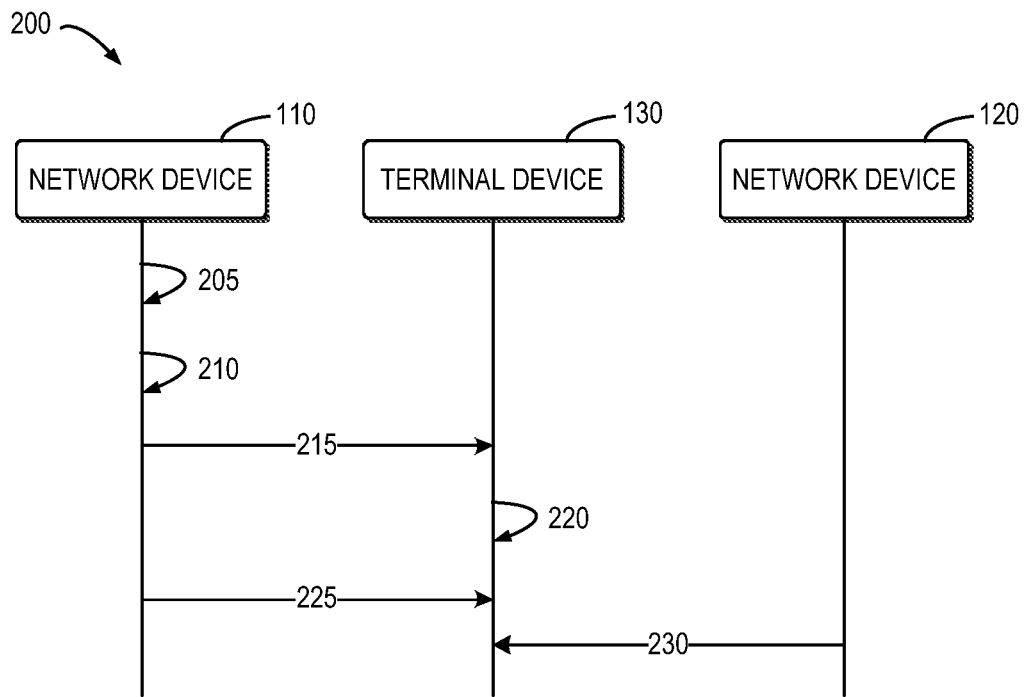
FIG. 2 shows a flowchart illustrating a process of communication between network devices and a terminal device in accordance with some embodiments of the present disclosure.

As shown in FIG. 2, the network device or TRP or panel 110 determines 205 TCI states 114 and 124. For example, the network devices or TRPs or panels 110 and 120 may determine TCI states 114 and 124 for their DMRS groups 112 and 122, respectively. In this event, the network device or TRP or panel 120 may inform the network device 110 of the TCI state 124, for example, via the communication link 155. More generally, the TCI states for respective DMRS groups of a plurality of network devices in communication with the terminal device 130 may be determined by any of the plurality of network devices. In some other embodiments, the plurality of network devices may have a common control entity which may determine the TCI states for the DMRS groups and inform the network device 110 of these determined TCI states.

In addition, the network device or TRP or panel 110 also determines 205 DMRS ports for the network devices or TRPs or panels 110 and 120 transmitting DMRSs to the terminal device 130. For example, the network devices or TRPs or panels 110 and 120 may determine their selected DMRS ports for transmitting DMRSs, respectively. In this event, the network device or TRP or panel 120 may inform the network device or TRP or panel 110 about the DMRS ports selected by the network devices or TRP or panel 120, for example, via the communication link 155.

More generally, the DMRS ports of a plurality of the network devices or TRPs or panels in communication with the terminal device 130 may be determined by any of the plurality of network devices or TRPs or panels. In some other embodiments, the plurality of network devices or TRPs or panels may have a common control entity which may determine the DMRS ports of the plurality of the network devices or TRPs or panels and inform the network device or TRP or panel 110 of these determined DMRS ports.

The network device or TRP or panel 110 generates 210 DCI 115 indicating the TCI states 114, 124 and the selected DMRS ports of the network devices or TRPs or panels 110, 120. In other words, different from conventional solutions, the TCI states and the DMRS ports indicated by the DCI 115 are for a plurality of DMRS groups 112, 122 which may correspond to a plurality of network devices or TRPs or panels 110, 120, respectively. As mentioned, in current 3GPP specifications, only one TCI field with 3 bits in the DCI (for example, DCI format 1_1) is supported. If two or more DMRS groups (such as DMRS groups 112 and 122) are introduced, two or more corresponding TCI fields may be needed. However, straightly increasing more TCI fields each with 3 bits may cause signaling overhead to be a little large.

In some embodiments, when a terminal device is configured with two TCI states in one DCI, there may be two TCI fields in the DCI. Each TCI field contains 3 bits if the TCI is configured to be present in the DCI.

In order to reduce the signaling overhead for indicating the TCI states 114, 124 and the DMRS ports of the network devices or TRPs or panels 110, 120, the network device or TRP or panel 110 may indicate the TCI state 114 in the DCI 115, and indicate whether the TCI state 124 is identical to the TCI state 114. In this event, the indication for the TCI state 124 may be reduced to only one bit. In other words, the overhead for indicating the TCI state 124 for the DMRS group 122 of the network device 120 may be minimized.

In some embodiments, a terminal device is configured with two TCI states (for example, TCI state #1 and TCI state #2) in one DCI. In some embodiments, TCI state #1 may be selected from TCI group X (for example, TCI group X includes TCI states $X_0, X_1, \ldots X_{w-1}$). There may be up to W TCI states within TCI group X In some embodiments, TCI state #2 may be selected from TCI group Y. There may be up to V TCI states within TCI group Y (for example, TCI group Y includes TCI states $Y_0, Y_1, \ldots Y_{v-1}$).

In some embodiments, the two TCI states #1 and #2 may be selected from a same TCI group, that is, W=V and X=Y. Specifically, there may be only one TCI group configured for TCI state #1 and #2. In some embodiments, the two TCI states #1 and #2 may be selected from different TCI groups, that is, W≠V and/or X≠Y, and/or at least one value in TCI group X is different from any value in TCI group Y. In some embodiments, TCI group Y for TCI state #2 may be a subset of TCI group X for TCI state #1. That is, V≤W, and each value of $Y_i$ in TCI group Y is included in TCI group X.

In some embodiments, the number of bits to indicate TCI state #1 and/or TCI state #2 may be ceil($\log_2(W)$). For example, W may be 1 or 2 or 4 or 8, and the number of bits to indicate TCI state #1 and/or TCI state #2 may be 0 or 1 or 2 or 3, respectively. For another example, the number of bits to indicate TCI state #1 and/or TCI state #2 may be fixed to be 3, and in the TCI group, the number of TCI states W may be no more than 8. For another example, the number of bits to indicate TCI state #1 and/or TCI state #2 may be fixed to be 2, and in the TCI group, the number of TCI states W may be no more than 4. For another example, the number of bits to indicate TCI state #1 and/or TCI state #2 may be fixed to be 1, and in the TCI group, the number of TCI states W may be no more than 2.

In some embodiments, the number of bits to indicate TCI state #2 may be ceil($\log_2(V)$). For example, V may be 1 or 2 or 4 or 8, and the number of bits to indicate TCI state #2 may be 0 or 1 or 2 or 3, respectively. For another example, the number of bits to indicate TCI state #2 may be fixed to be 3, and in the TCI group, the number of TCI states V may be no more than 8. For another example, the number of bits to indicate TCI state #2 may be fixed to be 2, and in the TCI group, the number of TCI states V may be no more than 4. For another example, the number of bits to indicate TCI state #2 may be fixed to be 1, and in the TCI group, the number of TCI states V may be no more than 2.

In some embodiments, the indication of TCI state #1 and indication of TCI state #2 may be different in the DCI. In some embodiments, the indication of TCI state #1 includes only one part, and TCI state #1 is explicitly configured with ceil($\log_2(W)$) bits. For example, W may be 1 or 2 or 4 or 8, and the number of bits to indicate TCI state #1 may be 0 or 1 or 2 or 3, respectively. For another example, the number of bits to indicate TCI state #1 may be fixed to be 3, and in the TCI group, the number of TCI states W may be no more than 8. For another example, the number of bits to indicate TCI state #1 may be fixed to be 2, and in the TCI group, the number of TCI states W may be no more than 4. For another example, the number of bits to indicate TCI state #1 may be fixed to be 1, and in the TCI group, the number of TCI states W may be no more than 2.

In some embodiments, for a given DMRS type, a given value of the maximum number/length of DMRS and a given number of codewords, the corresponding table for indication of at least one of antenna ports, the number of DMRS CDM group(s) without data, number of front-loaded DMRS symbols, the number of DMRS port(s), and the index(es) for DMRS port(s) may be Table Q. In some embodiments, the indication of TCI states #2 is indicated within Table Q. In some embodiments, within Table Q, there may be V values/indexes/indications indicating a same value of the number of DMRS CDM group(s) without data, a same value of the number of DMRS port(s), same index(es) for DMRS port(s), and/or a same value of the number of front-loaded DMRS symbols, where the V values/indexes/indications indicating the same value of the number of DMRS CDM group(s) without data, the same value of the number of DMRS port(s), same index(es) for DMRS port(s), and/or the same value of the number of front-loaded DMRS symbols in Table Q are used to indicate the up to V values of TCI state #2 within TCI group Y.

In some embodiments, for a given DMRS type, a given value of the maximum number/length of DMRS and a given value of the number of codewords, Table Q1 as below shows an example of the field of antenna port(s), indicating at least one of the number of DMRS CDM group(s) without data, the number of front-loaded DMRS symbols, the number of DMRS port(s), index(es) of DMRS port(s) and the value of TCI state #2. In Table Q1, J1k (where k is an integer and k>=1) is the value of indication. N_1k (where k is an integer and k>=1) is the number of DMRS CDM group(s) without data, for example, each of N_1k (where k is an integer and k>=1) may be 1 or 2 or 3. D_1k (where k is an integer and k>=1) is the DMRS port(s), for example, for a given value of k (where k is an integer and k>=1), D_1k may be at least one DMRS ports. F_1k (where k is an integer and k>=1) is the number of front-loaded DMRS symbols, for example, each of F_1k (where k is an integer and k>=1) may be 1 or 2.

In some embodiments, $Y_{i\_k}$ (where $i\_k \in \{0,1,\ldots vk-1\}$, k is an integer and k>=1, and vk is an integer and vk>=1) is the possible TCI values for given values of N_1k, D_1k and/or F_1k. For example, for different values of k, vk can be same or different. For another example, vk may be at least one of {1,2,3,4,5,6,7,8}. In some embodiments, for different values of k and/or vk, Y, k (where $i\_k \in \{0,1,\ldots vk-1\}$, k is an integer and k>=1, and vk is an integer and vk>=1) may be different subsets from a single group $Y_j$ (where $j \in \{0,1,\ldots M-1\}$, M is an integer and M>=1, and M>=max (vk)). That is, for each value of k and/or vk, $Y_{i\_k}$ (where $i\_k \in \{0,1,\ldots vk-1\}$) is a subset of $Y_1$ (where $j \in \{0,1,\ldots M-1\}$, M is an integer and M>=1, and M>=max(vk)). For example, the single group $Y_1$ (where $j \in \{0,1,\ldots M-1\}$) may be $\{Y_0, Y_1, Y_2, Y_3, Y_4, Y_5, Y_6, Y_7\}$, and for each value of k and/or vk, $Y_{i\_k}$ (where $i\_k \in \{0,1,\ldots vk-1\}$) is a subset of $\{Y_0, Y_1, Y_2, Y_3, Y_4, Y_5, Y_6, Y_7\}$.

In some embodiments, at least two DMRS ports within the DMRS port(s) indicated with D_1k (where k is an integer and k>=1) are multiplexed with FDM and/or TDM. It is to be understood that the specific values of the indicated value of $Y_{i\_k}$ (where $i\_k \in \{0,1,\ldots vk-1\}$, k is an integer and k>=1, and vk is an integer and vk>=1) for TCI state #2 is only an example, without any limitation on the embodiments of the present disclosure. The values indicated for TCI state #2 may have any suitable values in other embodiments. In some embodiments, it is also possible that, for a given DMRS type, a given value of the maximum number/length of DMRS, and a given value of the number of codewords, the corresponding table for indication of at least one of the number of DMRS CDM group(s) without data, the number of front-loaded DMRS symbols, the number of DMRS port(s), and the index(es) for DMRS port(s) is a subset of Table Q1. In some embodiments, there may be no column of the number of DMRS CDM group(s) without data and/or no column of DMRS port(s). In some embodiments, there may be no column of the number of front-loaded DMRS symbols in the table, for example, when the number of front-loaded DMRS symbol is fixed to be 1 or fixed to be 2.

TABLE Q1

| | Antenna port(s) (1000 + DMRS port) One or two Codeword(s): | | | |
|---|---|---|---|---|
| Value | Number of DMRS CDM group(s) without data | DMRS port(s) | Number of front-loaded DMRS symbols | Value of TCI state #2 |
| J11 + 0 | N_11 | D_11 | F_11 | $Y_{01}$ |
| J11 + 1 | N_11 | D_11 | F_11 | $Y_{11}$ |
| J11 + 2 | N_11 | D_11 | F_11 | $Y_{21}$ |
| ... | ... | ... | ... | ... |
| J11 + i | N_11 | D_11 | F_11 | $Y_{i\_1}$ |
| ... | ... | ... | ... | ... |
| J11 + (v1 − 1) | N_11 | D_11 | F_11 | $Y_{v1-1}$ |
| ... | ... | ... | ... | ... |
| J12 + 0 | N_12 | D_12 | F_12 | $Y_{02}$ |
| J12 + 1 | N_12 | D_12 | F_12 | $Y_{12}$ |
| J12 + 2 | N_12 | D_12 | F_12 | $Y_{22}$ |
| ... | ... | ... | ... | ... |
| J12 + j | N_12 | D_12 | F_12 | $Y_{i\_2}$ |
| ... | ... | ... | ... | ... |
| J12 + (v2 − 1) | N_12 | D_12 | F_12 | $Y_{v2-1}$ |
| ... | ... | ... | ... | ... |
| J1k + 0 | N_1k | D_1k | F_1k | $Y_{0k}$ |
| J1k + 1 | N_1k | D_1k | F_1k | $Y_{1k}$ |
| J1k + 2 | N_1k | D_1k | F_1k | $Y_{2k}$ |
| ... | ... | ... | ... | ... |
| J1k + j | N_1k | D_1k | F_1k | $Y_{i\_k}$ |
| ... | ... | ... | ... | ... |
| J1k + (vk − 1) | N_1k | D_1k | F_1k | $Y_{vk-1}$ |
| ... | ... | ... | ... | ... |

In some embodiments, the indication of TCI state #2 includes two parts. In some embodiments, the first part of indication of TCI state #2 is only one bit to indicate whether the value of TCI state #2 is same as or different from the value of TCI state #1. For example, if the one bit in the first part of TCI state #2 indication is 0, then the value of TCI state #2 is same as the value of TCI state #1, and if the one bit in the first part of TCI state #2 indication is 1, then the value of TCI state #2 is different from the value of TCI state #1. For another example, if the one bit in the first part of TCI state #2 indication is 0, then the value of TCI state #2 is different from the value of TCI state #1, and if the one bit in the first part of TCI state #2 indication is 1, then the value of TCI state #2 is same as the value of TCI state #1.

In some embodiments, the value of TCI state #2 is different from the value of TCI state #1. For a given DMRS type, a given value of the maximum number/length of DMRS and a given number of codewords, the corresponding table for indication of at least one of antenna ports, the number of DMRS CDM group(s) without data, the number of front-loaded DMRS symbols, the number of DMRS port(s), and the index(es) for DMRS port(s) may be Table Q. In some embodiments, the second part of indication of TCI states #2 is indicated within Table Q.

In some embodiments, within Table Q, there may be V values/indexes/indications indicating a same value of the number of DMRS CDM group(s) without data, a same value of the number of DMRS port(s), same index(es) for DMRS port(s), and/or a same value of the number of front-loaded DMRS symbols. The V values/indexes/indications indicating the same value of the number of DMRS CDM group(s) without data, the same value of the number of DMRS port(s), same index(es) for DMRS port(s), and/or the same value of the number of front-loaded DMRS symbols in Table Q are used to indicate the up to V values of TCI state #2 within TCI group Y, for example, when the indicated value of TCI state #1 is different from any one of possible values for TCI state #2 in TCI group Y.

In some embodiments, within Table Q, there may be V−1 values/indexes/indications indicating a same value of the number of DMRS CDM group(s) without data, a same value of the number of DMRS port(s), same index(es) for DMRS port(s), and/or a same value of the number of front-loaded DMRS symbols. The V−1 values/indexes/indications indicating the same value of the number of DMRS CDM group(s) without data, the same value of the number of DMRS port(s), same index(es) for DMRS port(s), and/or the same value of the number of front-loaded DMRS symbols in Table Q are used to indicate the up to V−1 values of TCI state #2 within TCI group Y, where the V−1 values of TCI states are different from the indicated TCI state #1, for example, when the indicated value of TCI state #1 is same as one of possible values for TCI state #2 in TCI group Y, and different from other V−1 possible values in TCI group Y.

In some embodiments, for a given DMRS type, a given value of the maximum number/length of DMRS, and a given value of the number of codewords, Tables Q2-A and Q2-B as below show an example of the field of antenna port(s), indicating at least one of the number of DMRS CDM group(s) without data, the number of front-loaded DMRS symbols, the number of DMRS port(s), index(es) of DMRS port(s) and the value of TCI state #2. In the tables, J2k (where k is an integer and k>=1) is the value of indication. N_2k (where k is an integer and k>=1) is the number of DMRS CDM group(s) without data, for example, each of N_2k (where k is an integer and k>=1) may be 1 or 2 or 3. D_2k (where k is an integer and k>=1) is the DMRS port(s), for example, for a given value of k (where k is an integer and k>=1), D_2k may be at least one DMRS ports. F_2k (where k is an integer and k>=1) is the number of front-loaded DMRS symbols, for example, each of F_2k (where k is an integer and k>=1) may be 1 or 2.

In some embodiments, Y, k (where i_k∈{0,1, . . . vk−1}, k is an integer and k>=1, and vk is an integer and vk>=1) are the possible TCI values for given values of N_2k and D_2k and/or F_2k. For example, for different values of k, vk can be same or different. For another example, vk may be at least one of {1,2,3,4,5,6,7,8}. In some embodiments, for different values of k and/or vk, Y, k (where i_k∈{0,1, . . . vk−1}, k is an integer and k>=1, and vk is an integer and vk>=1) may be different subsets from a single group $Y_1$ (where j∈{0,1, . . . M−1}, M is an integer and M>=1, and M>=max (vk)). That is, for each value of k and/or vk, $Y_{i\_k}$ (where i_k∈{0,1, vk−1}) is a subset of $Y_j$ (where j∈{0,1, . . . M−1}, M is an integer and M>=1, and M>=max(vk)). For example, the single group $Y_j$ (where j∈{0,1, . . . M−1}) may be {$Y_0$, $Y_1$, $Y_2$, $Y_3$, $Y_4$, $Y_5$, $Y_6$, $Y_7$}, and for each value of k and/or vk, $Y_{i\_k}$ (where i_k∈{0,1, . . . vk−1}) is a subset of {$Y_0$, $Y_1$, $Y_2$, $Y_3$, $Y_4$, $Y_5$, $Y_6$, $Y_7$}.

In some embodiments, at least two DMRS ports within the DMRS port(s) indicated with D_2k (where k is an integer and k>=1) are multiplexed with FDM and/or TDM. J2h (where h is an integer and h>=1) is the value of indication. N_2h (where h is an integer and h>=1) is the number of DMRS CDM group(s) without data, for example, each of N_2h (where h is an integer and h>=1) may be 1 or 2 or 3. D_2h (where h is an integer and h>=1) is the DMRS port(s), for example, for a given value of h (where h is an integer and h>=1), D_2h may be at least one DMRS ports. F_2h (where h is an integer and h>=1) is the number of front-loaded DMRS symbols, for example, each of F_2h (where h is an integer and h>=1) may be 1 or 2.

In some embodiments, $Y_{i\_h}$ (where i_h∈{0,1, . . . vh−1}, h is an integer and h>=1, and vh is an integer and vh>=1) are the possible TCI values for given values of N_2h, D_2h and/or F_2h. For example, for different values of h, vh can be same or different. For another example, vh may be at least one of {1,2,3,4,5,6,7,8}. In some embodiments, for different values of h and/or vh, $Y_{i\_h}$ (where i_h∈{0,1, . . . vh−1}, h is an integer and h>=1, and vh is an integer and vh>=1) may be different subsets from a single group $Y_j$ (where j∈{0,1, . . . M−1}, M is an integer and M>=1, and M>=max (vh)). That is, for each value of h and/or vh, $Y_{i\_h}$ (where i_h∈{0,1, . . . vh−1}) is a subset of $Y_j$ (where j∈{0,1, . . . M−1}, M is an integer and M>=1, and M>=max(vh)). For example, the single group $Y_j$ (where j∈{0,1, . . . M−1}) may be {$Y_0$, $Y_1$, $Y_2$, $Y_3$, $Y_4$, $Y_5$, $Y_6$, $Y_7$}, and for each value of h and/or vh, $Y_{i\_h}$ (where i_h∈{0,1, . . . vh−1}) is a subset of {$Y_0$, $Y_1$, $Y_2$, $Y_3$, $Y_4$, $Y_5$, $Y_6$, $Y_7$}. In some embodiments, at least two DMRS ports within the DMRS port(s) indicated with D_2h (where h is an integer and h>=1) are multiplexed with FDM and/or TDM.

In some embodiments, $Y_{p\_k}$ is indicated for TCI state #1, and $Y_{p\_k}$ is included within $Y_{i\_k}$ (where i_k∈{0,1, . . . vk−1}). In this case, if the value of TCI state #2 is indicated to be different from the value of TCI state #1, except for $Y_{p\_k}$ (which is indicated for TCI state #1), there may be vk−1 possible values for TCI state #2. That is, there may be vk−1 values/indexes/indications indicating a same value of the number of DMRS CDM group(s) without data, a same value of the number of DMRS port(s), same index(es) for DMRS port(s), and/or a same value of the number of front-loaded DMRS symbols. The vk−1 values/indexes/indications indicating the same value of the number of DMRS CDM group(s) without data, the same value of the number of DMRS port(s), same index(es) for DMRS port(s), and/or the same value of the number of front-loaded DMRS symbols are used to indicate the up to vk-1 values $Y_{i\_k}$ (where i_k∈{0,1, . . . vk−1} and i_k≠p_k) of TCI state #2 within the TCI group, where the vk-1 values of TCI states are different from the indicated value $Y_{p\_k}$ of TCI state #1.

As a specific example, Table Q2-A shows an example when Yok is indicated for TCI state #1. In this case, if the value of TCI state #2 is indicated to be different from the value of TCI state #1, except for Yok (which is indicated for TCI state #1), there may be vk-1 possible values for TCI state #2. That is, there may be vk-1 values/indexes/indications indicating a same value of the number of DMRS CDM group(s) without data, a same value of the number of DMRS port(s), same index(es) for DMRS port(s), and/or a same value of the number of front-loaded DMRS symbols. The vk-1 values/indexes/indications indicating the same value of the number of DMRS CDM group(s) without data, the same value of the number of DMRS port(s), same index(es) for DMRS port(s), and/or the same value of the number of front-loaded DMRS symbols in Table Q2-A are used to indicate the up to vk-1 values $Y_{i\_k}$ (where $i\_k \in \{0,1, \ldots vk-1\}$ and $i\_k \neq 0k$) of TCI state #2 within the TCI group, where the vk-1 values of TCI states are different from the indicated TCI state #1.

It is to be understood that the specific values of the indicated value of $Y_{0k}$ for TCI state #1 is only an example, without any limitation on the embodiments of the present disclosure. The values indicated for TCI state #1 may have any suitable values of $Y_{i\_k}$ (where $i\_k \in \{0,1, \ldots vk-1\}$, k is an integer and k>=1, and vk is an integer and vk>=1) in other embodiments. It is to be understood that the specific values of the indicated value of $Y_{i\_k}$ (where $i\_k \in \{0, 1, \ldots vk-1\}$ for TCI state #2, except for the value of $Y_j$ for TCI state #1) is only an example, without any limitation on the embodiments of the present disclosure. The values indicated for TCI state #2 may have any suitable values in other embodiments.

In some embodiments, it is also possible that, for a given DMRS type, a given value of the maximum number/length of DMRS, and a given value of the number of codewords, the corresponding table for indication of at least one of the number of DMRS CDM group(s) without data, the number of front-loaded DMRS symbols, the number of DMRS port(s), and the index(es) for DMRS port(s) is a subset of Table Q2-A. In some embodiments, there may be no column of the number of front-loaded DMRS symbols in the table, for example, when the number of front-loaded DMRS symbol is fixed to be 1 or fixed to be 2.

TABLE Q2-A

Antenna port(s) (1000 + DMRS port)
One or two Codeword(s):

| Value | Number of DMRS CDM group(s) without data | DMRS port(s) | Number of front-loaded DMRS symbols | Value of TCI state #2 |
|---|---|---|---|---|
| J2k + 0 | N__2k | D__2k | F__2k | $Y_{1k}$ |
| J2k + 1 | N__2k | D__2k | F__2k | $Y_{2k}$ |
| J2k + 2 | N__2k | D__2k | F__2k | $Y_{3k}$ |
| ... | ... | ... | ... | ... |
| J2k + n | N__2k | D__2k | F__2k | $Y_{i\_k}$ |
| ... | ... | ... | ... | ... |
| J2k + (vk − 2) | N__2k | D__2k | F__2k | $Y_{(vk-1)}$ |
| ... | ... | ... | ... | ... |

In some embodiments, $Y_q$ is indicated for TCI state #1, and $Y_q$ is not included within $Y_{i\_h}$ (where $i\_h \in \{0,1, \ldots vh-1\}$, h is an integer and h>=1, and vh is an integer and vh>=1). In this case, if the value of TCI state #2 is indicated to be different from the value of TCI state #1, there may be vh possible values for TCI state #2. That is, there may be vh values/indexes/indications indicating a same value of the number of DMRS CDM group(s) without data, a same value of the number of DMRS port(s), same index(es) for DMRS port(s), and/or a same value of the number of front-loaded DMRS symbols. The vh values/indexes/indications indicating the same value of the number of DMRS CDM group(s) without data, the same value of the number of DMRS port(s), same index(es) for DMRS port(s), and/or the same value of the number of front-loaded DMRS symbols are used to indicate the up to vh values $Y_{i\_h}$ (where $i\_h \in \{0,1, \ldots vh-1\}$) of TCI state #2 within the TCI group, where the vh values of TCI states are different from the indicated value $Y_q$ of TCI state #1.

As a specific example, Table Q2-B shows an example when $Y_q$ is indicated for TCI state #1. In this case, if the value of TCI state #2 is indicated to be different from the value of TCI state #1, there may be vh possible values for TCI state #2. That is, there may be vh values/indexes/indications indicating a same value of the number of DMRS CDM group(s) without data, a same value of the number of DMRS port(s), same index(es) for DMRS port(s), and/or a same value of the number of front-loaded DMRS symbols. The vh values/indexes/indications indicating the same value of the number of DMRS CDM group(s) without data, the same value of the number of DMRS port(s), same index(es) for DMRS port(s), and/or the same value of the number of front-loaded DMRS symbols in Table Q2-B are used to indicate the up to vh values $Y_{i\_h}$ (where $i\_h \in \{0,1, \ldots vh-1\}$) of TCI state #2 within the TCI group, where the vh values of TCI states are different from the indicated TCI state #1.

It is to be understood that the specific values of the indicated value of $Y_q$ for TCI state #1 is only an example, without any limitation on the embodiments of the present disclosure. The values indicated for TCI state #1 may have any suitable values of $Y_q$ that is different from any value within $Y_{i\_h}$ (where $i\_h \in \{0,1, \ldots vh-1\}$, h is an integer and h>=1, and vh is an integer and vh>=1) in other embodiments. It is to be understood that the specific values of the indicated value of $Y_{i\_h}$ (where $i\_h \in \{0,1, \ldots vh-1\}$, h is an integer and h>=1, and vh is an integer and vh>=1) for TCI state #2 is only an example, without any limitation on the embodiments of the present disclosure. The values indicated for TCI state #2 may have any suitable values in other embodiments.

In some embodiments, it is also possible that, for a given DMRS type, a given value of the maximum number/length of DMRS, and a given value of the number of codewords, the corresponding table for indication of at least one of the number of DMRS CDM group(s) without data, the number of front-loaded DMRS symbols, the number of DMRS port(s), and the index(es) for DMRS port(s) is a subset of Table Q2-B. In some embodiments, there may be no column of the number of front-loaded DMRS symbols in the table, for example, when the number of front-loaded DMRS symbol is fixed to be 1 or fixed to be 2.

TABLE Q2-B

Antenna port(s) (1000 + DMRS port)
One or two Codeword(s):

| Value | Number of DMRS CDM group(s) without data | DMRS port(s) | Number of front-loaded DMRS symbols | Value of TCI state #2 |
|---|---|---|---|---|
| J2h + 0 | N_2h | D_2h | F_2h | $Y_{1h}$ |
| J2h + 1 | N_2h | D_2h | F_2h | $Y_{2h}$ |
| J2h + 2 | N_2h | D_2h | F_2h | $Y_{3h}$ |
| ... | ... | ... | ... | ... |
| J2h + i | N_2h | D_2h | F_2h | $Y_{i\_h}$ |
| ... | ... | ... | ... | ... |
| J2h + (vh − 1) | N_2h | D_2h | F_2h | $Y_{(vh-1)}$ |
| ... | ... | ... | ... | ... |

In some embodiments, Table 2Q-A and Table 2Q-B may be combined, for example, when $Y_q$ is indicated for TCI state #1, $Y_q$ is not included within $Y_{i\_h}$ (where i_h∈{0,1, ... vh−1}, h is an integer and h>=1, and vh is an integer and vh>=1), but $Y_q$ is included within $Y_{i\_k}$ (where i_k∈{0,1, ... vk−1}. In this case, there may be vh values/indexes/indications indicating given values of N_2h, D_2h and/or F_2h. The vh values/indexes/indications indicating the given values of N_2h, D_2h and/or F_2h are used to indicate the up to vh values $Y_{i\_h}$ (where i_h∈{0,1, ... vh−1}) of TCI state #2 within the TCI group, where the vh values of TCI states are different from the indicated value $Y_q$ of TCI state #1. There may be vk−1 values/indexes/indications indicating given values of N_2k and D_2k and/or F_2k. The vk−1 values/indexes/indications indicating the given values of N_2k and D_2k and/or F_2k are used to indicate the up to vk−1 values Y, k (where i_k∈{0,1, ... vk−1} and i_k≠0k) of TCI state #2 within the TCI group, where the vk−1 values of TCI states are different from the indicated TCI state #1.

For example, the network device 110 may indicate the TCI state 114 by 3 bits in the DCI 115, such as TCI state B. For the TCI state 124, if the one bit is set to be zero, the TCI state 124 is the same as the TCI state 114, namely, TCI state B. In this example, the TCI state 114 may be one of eight possible TCI states and may be indicated by the 3 bits. In some other embodiments, the TCI state 114 may have any number of possible TCI states and may be indicated by any appropriate number of bits.

If the network device 110 indicates in the DCI 115 that the TCI state 124 is different from the TCI state 114, the network device 110 may indicate the TCI state 124 and the DMRS ports used to transmit DMRSs 125 and 135 in the DCI 115 using a single indication. In other words, the TCI field 124 for the DMRS group 122 is combinatorial configured with the DMRS ports for the plurality of the network devices transmitting DMRSs. In this way, the specific TCI state indications for the network device 120 are implemented by reusing the existing field of the DCI, and thus there is no extra overhead.

In some embodiments, as a specific example, the TCI states may be up to 8 (for example, TCI state {A,B,C,D,E,F,G,H}). For example, TCI state B is configured for the TCI field 114. For DMRS type 1 and if the maximum number/length of DMRS is 2 and/or the number of codewords is 1, the TCI field 124 and the DMRS ports may be indicated by the field of antenna port(s) carried in the DCI 115 according to following Table II-A-1. In Table II-A-1, the TCI field 124 is referred to as a second TCI state more generally. It is to be understood that the specific values of the indicated value of B for TCI state #1 is only an example, without any limitation on the embodiments of the present disclosure. The values indicated for TCI state #1 may have any suitable values from {A,B,C,D,E,F,G,H} in other embodiments.

In some embodiments, it is also possible that, for DMRS type 1 and if the maximum number/length of DMRS is 2 and/or the number of codewords is 1, the corresponding table for indication of at least one of the number of DMRS CDM group(s) without data, the number of front-loaded DMRS symbols, the number of DMRS port(s), the index(es) for DMRS port(s) and the value of the second TCI state is a subset of Table II-A-1. In some embodiments, there may be no column of the number of front-loaded DMRS symbols in the table, for example, when the number of front-loaded DMRS symbol is fixed to be 1 or fixed to be 2. In some embodiments, there may be no column of the number of DMRS CDM group(s) without data in the table. In some embodiments, the number of DMRS CDM group(s) without data may be fixed to be 1 or fixed to be 2. In some embodiments, the value of the number of DMRS CDM group(s) without data may not be 1.

In some embodiments, the DMRS port(s) may be a subset of {(0-2), (0-3), (0,2), (0,2,4,6)} in the table. In some embodiments, the DMRS port(s) may be some other configuration, and in the configuration, there are more than one DMRS ports. Within the more than one DMRS ports, at least two DMRS ports are multiplexed with FDM and/or TDM. In some embodiments, the DMRS port(s) may be some other configuration, and in the configuration, there are more than one DMRS ports. Within the more than one DMRS ports, at least two DMRS ports are from different DMRS groups. For example, at least one DMRS port is from DMRS group $G_1$, and at least one DMRS port is from DMRS group $G_2$.

In some embodiments, the values of the second TCI state may be a subset of {A,B,C,D,E,F,G,H} in the table. In some embodiments, for different configurations of DMRS port(s), the numbers of values of the second TCI state may be different. In some embodiments, if the number of indications (where the indications are not "reserved") is R, the bits for the table is ceil($\log_2(R)$). In some embodiments, for different configurations of DMRS port(s), the numbers of values of the second TCI state may be different.

TABLE II-A-1

Antenna port(s) (1000 + DMRS port), dmrs-Type = 1, maxLength = 2
One or two Codewords

| Value | Number of DMRS CDM group(s) without data | DMRS port(s) | Number of front-load symbols | Second TCI state |
|---|---|---|---|---|
| 0 | 2 | 0-2 | 1 | A |
| 1 | 2 | 0-2 | 1 | C |

TABLE II-A-1-continued

Antenna port(s) (1000 + DMRS port), dmrs-Type = 1, maxLength = 2
One or two Codewords

| Value | Number of DMRS CDM group(s) without data | DMRS port(s) | Number of front-load symbols | Second TCI state |
|---|---|---|---|---|
| 2 | 2 | 0-2 | 1 | D |
| 3 | 2 | 0-2 | 1 | E |
| 4 | 2 | 0-2 | 1 | F |
| 5 | 2 | 0-2 | 1 | G |
| 6 | 2 | 0-2 | 1 | H |
| 7 | 2 | 0-3 | 1 | A |
| 8 | 2 | 0-3 | 1 | C |
| 9 | 2 | 0-3 | 1 | D |
| 10 | 2 | 0-3 | 1 | E |
| 11 | 2 | 0-3 | 1 | F |
| 12 | 2 | 0-3 | 1 | G |
| 13 | 2 | 0-3 | 1 | H |
| 14 | 2 | 0, 2 | 1 | A |
| 15 | 2 | 0, 2 | 1 | C |
| 16 | 2 | 0, 2 | 1 | D |
| 17 | 2 | 0, 2 | 1 | E |
| 18 | 2 | 0, 2 | 1 | F |
| 19 | 2 | 0, 2 | 1 | G |
| 20 | 2 | 0, 2 | 1 | H |
| 21 | 2 | 0, 2, 4, 6 | 2 | A |
| 22 | 2 | 0, 2, 4, 6 | 2 | C |
| 23 | 2 | 0, 2, 4, 6 | 2 | D |
| 24 | 2 | 0, 2, 4, 6 | 2 | E |
| 25 | 2 | 0, 2, 4, 6 | 2 | F |
| 26 | 2 | 0, 2, 4, 6 | 2 | G |
| 27 | 2 | 0, 2, 4, 6 | 2 | H |
| 28 | Reserved | Reserved | Reserved | Reserved |
| 29 | Reserved | Reserved | Reserved | Reserved |
| 30 | Reserved | Reserved | Reserved | Reserved |
| 31 | Reserved | Reserved | Reserved | Reserved |

As a specific example, the TCI states may be up to 8 (for example, TCI state {A,B,C,D,E,F,G,H}). For example, TCI state C is configured for the TCI field 114. For DMRS type 1 and if the maximum number/length of DMRS is 2 and/or the number of codewords is 2, the TCI field 124 and the DMRS ports may be indicated by the field of antenna port(s) carried in the DCI 115 according to following Table II-A-2. In Table II-A-2, the TCI field 124 is referred to as a second TCI state more generally. It is to be understood that the specific values of the indicated value of C for TCI state #1 is only an example, without any limitation on the embodiments of the present disclosure. The values indicated for TCI state #1 may have any suitable values from {A,B,C,D,E,F,G,H} in other embodiments.

In some embodiments, it is also possible that, for DMRS type 1 and if the maximum number/length of DMRS is 2 and/or the number of codewords is 2, the corresponding table for indication of at least one of the number of DMRS CDM group(s) without data, the number of front-loaded DMRS symbols, the number of DMRS port(s), the index(es) for DMRS port(s) and the value of the second TCI state is a subset of Table II-A-2. In some embodiments, there may be no column of the number of front-loaded DMRS symbols in the table, for example, when the number of front-loaded DMRS symbol is fixed to be 1 or fixed to be 2. In some embodiments, there may be no column of the number of DMRS CDM group(s) without data in the table. In some embodiments, the number of DMRS CDM group(s) without data may be fixed to be 1 or fixed to be 2. In some embodiments, the value of the number of DMRS CDM group(s) without data may not be 1.

In some embodiments, the DMRS port(s) may be a subset of {(0-4), (0,1,2,3,4,6), (0,1,2,3,4,5,6), (0,1,2,3,4,5,6,7)} in the table. In some embodiments, the DMRS port(s) may be some other configuration, and in the configuration, there are more than one DMRS ports. Within the more than one DMRS ports, at least two DMRS ports are multiplexed with FDM and/or TDM. In some embodiments, the DMRS port(s) may be some other configuration, and in the configuration, there are more than one DMRS ports. Within the more than one DMRS ports, at least two DMRS ports are from different DMRS groups. For example, at least one DMRS port is from DMRS group $G_1$, and at least one DMRS port is from DMRS group $G_2$.

In some embodiments, the values of the second TCI state may be a subset of {A,B,C,D,E,F,G,H} in the table. In some embodiments, for different configurations of DMRS port(s), the numbers of values of the second TCI state may be different. In some embodiments, if the number of indications (where the indications are not "reserved") is R, the bits for the table is ceil($\log_2(R)$). In some embodiments, the number of bits for Table II-A-2 is same as the number of bits for Table II-A-1, that is, the table where DMRS type is 1, the maximum number/length of DMRS is 2 and the number of codewords is 1. In some embodiments, for different configurations of DMRS port(s), the numbers of values of the second TCI state may be different.

TABLE II-A-2

Antenna port(s) (1000 + DMRS port), dmrs-Type = 1, maxLength = 2
One or two Codewords:

| Value | Number of DMRS CDM group(s) without data | DMRS port(s) | Number of front-load symbols | Second TCI state |
|---|---|---|---|---|
| 0 | 2 | 0-4 | 2 | A |
| 1 | 2 | 0-4 | 2 | B |
| 2 | 2 | 0-4 | 2 | D |
| 3 | 2 | 0-4 | 2 | E |
| 4 | 2 | 0-4 | 2 | F |
| 5 | 2 | 0-4 | 2 | G |
| 6 | 2 | 0-4 | 2 | H |
| 7 | 2 | 0, 1, 2, 3, 4, 6 | 2 | A |
| 8 | 2 | 0, 1, 2, 3, 4, 6 | 2 | B |
| 9 | 2 | 0, 1, 2, 3, 4, 6 | 2 | D |
| 10 | 2 | 0, 1, 2, 3, 4, 6 | 2 | E |
| 11 | 2 | 0, 1, 2, 3, 4, 6 | 2 | F |
| 12 | 2 | 0, 1, 2, 3, 4, 6 | 2 | G |
| 13 | 2 | 0, 1, 2, 3, 4, 6 | 2 | H |
| 14 | 2 | 0, 1, 2, 3, 4, 5, 6 | 2 | A |
| 15 | 2 | 0, 1, 2, 3, 4, 5, 6 | 2 | B |
| 16 | 2 | 0, 1, 2, 3, 4, 5, 6 | 2 | D |
| 17 | 2 | 0, 1, 2, 3, 4, 5, 6 | 2 | E |
| 18 | 2 | 0, 1, 2, 3, 4, 5, 6 | 2 | F |
| 19 | 2 | 0, 1, 2, 3, 4, 5, 6 | 2 | G |
| 20 | 2 | 0, 1, 2, 3, 4, 5, 6 | 2 | H |
| 21 | 2 | 0, 1, 2, 3, 4, 5, 6, 7 | 2 | A |
| 22 | 2 | 0, 1, 2, 3, 4, 5, 6, 7 | 2 | B |
| 23 | 2 | 0, 1, 2, 3, 4, 5, 6, 7 | 2 | D |
| 24 | 2 | 0, 1, 2, 3, 4, 5, 6, 7 | 2 | E |
| 25 | 2 | 0, 1, 2, 3, 4, 5, 6, 7 | 2 | F |
| 26 | 2 | 0, 1, 2, 3, 4, 5, 6, 7 | 2 | G |
| 27 | 2 | 0, 1, 2, 3, 4, 5, 6, 7 | 2 | H |
| 28 | Reserved | Reserved | Reserved | Reserved |
| 29 | Reserved | Reserved | Reserved | Reserved |
| 30 | Reserved | Reserved | Reserved | Reserved |
| 31 | Reserved | Reserved | Reserved | Reserved |

In some embodiments, as a specific example, the TCI states may be up to 8 (for example, TCI state {A,B,C,D,E, F,G,H}). For example, TCI state B is configured for the TCI field 114. For DMRS type 1 and if the maximum number/length of DMRS is 1 and/or the number of codewords is 1, the TCI field 124 and the DMRS ports may be indicated by the field of antenna port(s) carried in the DCI 115 according to following Table II-B-1. In Table II-B-1, the TCI field 124 is referred to as a second TCI state more generally. It is to be understood that the specific values of the indicated value of B for TCI state #1 is only an example, without any limitation on the embodiments of the present disclosure. The values indicated for TCI state #1 may have any suitable values from {A,B,C,D,E,F,G,H} in other embodiments. In some embodiments, it is also possible that, for DMRS type 1 and if the maximum number/length of DMRS is 1 and/or the number of codewords is 1, the corresponding table for indication of at least one of the number of DMRS CDM group(s) without data, the number of front-loaded DMRS symbols, the number of DMRS port(s), the index(es) for DMRS port(s) and the value of the second TCI state is a subset of Table II-B-1. In some embodiments, there may be no column of the number of front-loaded DMRS symbols in the table, for example, when the number of front-loaded DMRS symbol is fixed to be 1 or fixed to be 2. In some embodiments, there may be no column of the number of DMRS CDM group(s) without data in the table. In some embodiments, the number of DMRS CDM group(s) without data may be fixed to be 1 or fixed to be 2. In some embodiments, the value of the number of DMRS CDM group(s) without data may not be 1.

In some embodiments, the DMRS port(s) may be a subset of {(0-2), (0-3), (0,2)} in the table. In some embodiments, the DMRS port(s) may be some other configuration, and in the configuration, there are more than one DMRS ports. Within the more than one DMRS ports, at least two DMRS ports are multiplexed with FDM and/or TDM. In some embodiments, the DMRS port(s) may be some other configuration, and in the configuration, there are more than one DMRS ports. Within the more than one DMRS ports, at least two DMRS ports are from different DMRS groups. For example, at least one DMRS port is from DMRS group $G_1$, and at least one DMRS port is from DMRS group $G_2$.

In some embodiments, the values of the second TCI state may be a subset of {A,B,C,D,E,F,G,H} in the table. In some embodiments, for different configurations of DMRS port(s), the numbers of values of the second TCI state may be different. In some embodiments, if the number of indications (where the indications are not "reserved") is R, the bits for the table is ceil($\log_2$(R)). In some embodiments, for different configurations of DMRS port(s), the numbers of values of the second TCI state may be different.

TABLE II-B-1

Antenna port(s) (1000 + DMRS port), dmrs-Type = 1, maxLength = 1
One or two Codewords

| Value | Number of DMRS CDM group(s) without data | DMRS port(s) | Second TCI state |
| --- | --- | --- | --- |
| 0 | 2 | 0-2 | A |
| 1 | 2 | 0-2 | C |
| 2 | 2 | 0-2 | D |
| 3 | 2 | 0-2 | E |
| 4 | 2 | 0-2 | F |
| 5 | 2 | 0-2 | G |
| 6 | 2 | 0-2 | H |
| 7 | 2 | 0-3 | A |
| 8 | 2 | 0-3 | C |
| 9 | 2 | 0-3 | D |
| 10 | 2 | 0-3 | E |
| 11 | 2 | 0-3 | F |
| 12 | 2 | 0-3 | G |
| 13 | 2 | 0-3 | H |
| 14 | 2 | 0, 2 | A |
| 15 | 2 | 0, 2 | C |
| 16 | 2 | 0, 2 | D |

TABLE II-B-1-continued

Antenna port(s) (1000 + DMRS port), dmrs-Type = 1, maxLength = 1
One or two Codewords

| Value | Number of DMRS CDM group(s) without data | DMRS port(s) | Second TCI state |
| --- | --- | --- | --- |
| 17 | 2 | 0, 2 | E |
| 18 | 2 | 0, 2 | F |
| 19 | 2 | 0, 2 | G |
| 20 | 2 | 0, 2 | H |
| 21 | Reserved | Reserved | Reserved |
| 22 | Reserved | Reserved | Reserved |
| 23 | Reserved | Reserved | Reserved |
| 24 | Reserved | Reserved | Reserved |
| 25 | Reserved | Reserved | Reserved |
| 26 | Reserved | Reserved | Reserved |
| 27 | Reserved | Reserved | Reserved |
| 28 | Reserved | Reserved | Reserved |
| 29 | Reserved | Reserved | Reserved |
| 30 | Reserved | Reserved | Reserved |
| 31 | Reserved | Reserved | Reserved |

As a specific example, the TCI states may be up to 8 (for example, TCI state {A,B,C,D,E,F,G,H}). For example, TCI state C is configured for the TCI field 114. For DMRS type 2 and if the maximum number/length of DMRS is 1 and/or the number of codewords is 1, the TCI field 124 and the DMRS ports may be indicated by the field of antenna port(s) carried in the DCI 115 according to following Table II-C-1. In Table II-C-1, the TCI field 124 is referred to as a second TCI state more generally. It is to be understood that the specific values of the indicated value of C for TCI state #1 is only an example, without any limitation on the embodiments of the present disclosure. The values indicated for TCI state #1 may have any suitable values of {A,B,C,D,E,F,G,H} in other embodiments.

In some embodiments, it is also possible that, for DMRS type 2 and if the maximum number/length of DMRS is 1 and/or the number of codewords is 1, the corresponding table for indication of at least one of the number of DMRS CDM group(s) without data, the number of front-loaded DMRS symbols, the number of DMRS port(s), the index(es) for DMRS port(s) and the value of the second TCI state is a subset of Table II-C-1. In some embodiments, there may be no column of the number of front-loaded DMRS symbols in the table, for example, when the number of front-loaded DMRS symbol is fixed to be 1 or fixed to be 2. In some embodiments, there may be no column of the number of DMRS CDM group(s) without data in the table. In some embodiments, the number of DMRS CDM group(s) without data may be fixed to be 1 or fixed to be 2 or fixed to be 3. In some embodiments, the value of the number of DMRS CDM group(s) without data may not be 1.

In some embodiments, the DMRS port(s) may be a subset of {(0-2), (0-3), (0,2), (3-5)} in the table. In some embodiments, the DMRS port(s) may be some other configuration, and in the configuration, there are more than one DMRS ports. Within the more than one DMRS ports, at least two DMRS ports are multiplexed with FDM and/or TDM. In some embodiments, the DMRS port(s) may be some other configuration, and in the configuration, there are more than one DMRS ports. Within the more than one DMRS ports, at least two DMRS ports are from different DMRS groups. For example, at least one DMRS port is from DMRS group $G_1$, and at least one DMRS port is from DMRS group $G_2$.

In some embodiments, the values of the second TCI state may be a subset of {A,B,C,D,E,F,G,H} in the table. In some embodiments, for different configurations of DMRS port(s), the numbers of values of the second TCI state may be different. In some embodiments, if the number of indications (where the indications are not "reserved") is R, the bits for the table is ceil($\log_2(R)$). In some embodiments, for different configurations of DMRS port(s), the numbers of values of the second TCI state may be different.

TABLE II-C-1

Antenna port(s) (1000 + DMRS port), dmrs-Type = 2, maxLength = 1
One or two Codewords

| Value | Number of DMRS CDM group(s) without data | DMRS port(s) | Second TCI state |
|---|---|---|---|
| 0 | 2 | 0-2 | A |
| 1 | 2 | 0-2 | B |
| 2 | 2 | 0-2 | D |
| 3 | 2 | 0-2 | E |
| 4 | 2 | 0-2 | F |
| 5 | 2 | 0-2 | G |
| 6 | 2 | 0-2 | H |
| 7 | 2 | 0-3 | A |
| 8 | 2 | 0-3 | B |
| 9 | 2 | 0-3 | D |
| 10 | 2 | 0-3 | E |
| 11 | 2 | 0-3 | F |
| 12 | 2 | 0-3 | G |
| 13 | 2 | 0-3 | H |
| 14 | 2 | 0, 2 | A |
| 15 | 2 | 0, 2 | B |
| 16 | 2 | 0, 2 | D |
| 17 | 2 | 0, 2 | E |
| 18 | 2 | 0, 2 | F |
| 19 | 2 | 0, 2 | G |
| 20 | 2 | 0, 2 | H |
| 21 | 3 | 0-2 | A |
| 22 | 3 | 0-2 | B |
| 23 | 3 | 0-2 | D |
| 24 | 3 | 0-2 | E |
| 25 | 3 | 0-2 | F |
| 26 | 3 | 0-2 | G |
| 27 | 3 | 0-2 | H |
| 28 | 3 | 0-3 | A |
| 29 | 3 | 0-3 | B |
| 30 | 3 | 0-3 | D |
| 31 | 3 | 0-3 | E |
| 32 | 3 | 0-3 | F |
| 33 | 3 | 0-3 | G |
| 34 | 3 | 0-3 | H |
| 35 | 3 | 3-5 | A |
| 36 | 3 | 3-5 | B |
| 37 | 3 | 3-5 | D |
| 38 | 3 | 3-5 | E |
| 39 | 3 | 3-5 | F |
| 40 | 3 | 3-5 | G |
| 41 | 3 | 3-5 | H |
| 42-63 | Reserved | Reserved | Reserved |

As a specific example, the TCI states may be up to 8 (for example, TCI state {A,B,C,D,E,F,G,H}). For example, TCI state C is configured for the TCI field 114. For DMRS type 2 and if the maximum number/length of DMRS is 1 and/or the number of codewords is 2, the TCI field 124 and the DMRS ports may be indicated by the field of antenna port(s) carried in the DCI 115 according to following Table II-C-2. In Table II-C-2, the TCI field 124 is referred to as a second TCI state more generally. It is to be understood that the specific values of the indicated value of C for TCI state #1 is only an example, without any limitation on the embodiments of the present disclosure. The values indicated for TCI state #1 may have any suitable values from {A,B,C,D,E,F,G,H} in other embodiments.

In some embodiments, it is also possible that, for DMRS type 2 and if the maximum number/length of DMRS is 1 and/or the number of codewords is 2, the corresponding table for indication of at least one of the number of DMRS CDM group(s) without data, the number of front-loaded DMRS symbols, the number of DMRS port(s), the index(es) for DMRS port(s) and the value of the second TCI state is a subset of Table II-C-2. In some embodiments, there may be no column of the number of front-loaded DMRS symbols in the table, for example, when the number of front-loaded DMRS symbol is fixed to be 1 or fixed to be 2. In some embodiments, there may be no column of the number of DMRS CDM group(s) without data in the table. In some embodiments, the number of DMRS CDM group(s) without data may be fixed to be 1 or fixed to be 2 or fixed to be 3. In some embodiments, the value of the number of DMRS CDM group(s) without data may not be 1.

In some embodiments, the DMRS port(s) may be a subset of {(0-4), (0-5)} in the table. In some embodiments, the DMRS port(s) may be some other configuration, and in the configuration, there are more than one DMRS ports. Within the more than one DMRS ports, at least two DMRS ports are multiplexed with FDM and/or TDM. In some embodiments, the DMRS port(s) may be some other configuration, and in the configuration, there are more than one DMRS ports. Within the more than one DMRS ports, at least two DMRS ports are from different DMRS groups. For example, at least one DMRS port is from DMRS group $G_1$, and at least one DMRS port is from DMRS group $G_2$.

In some embodiments, the values of the second TCI state may be a subset of {A,B,C,D,E,F,G,H} in the table. In some embodiments, for different configurations of DMRS port(s), the numbers of values of the second TCI state may be different. In some embodiments, if the number of indications (where the indications are not "reserved") is R, the bits for the table is ceil($\log_2(R)$). In some embodiments, the number of bits for Table II-C-2 is same as the number of bits for Table II-C-1, that is, the table where DMRS type is 2, the maximum number/length of DMRS is 1 and the number of codewords is 1. In some embodiments, for different configurations of DMRS port(s), the numbers of values of the second TCI state may be different. In some embodiments, T may be 63 or 31 or 15.

TABLE II-C-2

Antenna port(s) (1000 + DMRS port), dmrs-Type = 2, maxLength = 1
One or Two Codewords:

| Value | Number of DMRS CDM group(s) without data | DMRS port(s) | Second TCI state |
|---|---|---|---|
| 0 | 3 | 0-4 | A |
| 1 | 3 | 0-4 | B |
| 2 | 3 | 0-4 | D |
| 3 | 3 | 0-4 | E |
| 4 | 3 | 0-4 | F |
| 5 | 3 | 0-4 | G |
| 6 | 3 | 0-4 | H |
| 7 | 3 | 0-5 | A |
| 8 | 3 | 0-5 | B |
| 9 | 3 | 0-5 | D |
| 10 | 3 | 0-5 | E |
| 11 | 3 | 0-5 | F |
| 12 | 3 | 0-5 | G |
| 13 | 3 | 0-5 | H |
| 14-T | Reserved | Reserved | Reserved |

As a specific example, the TCI states may be up to 8 (for example, TCI state {A,B,C,D,E,F,G,H}). For example, TCI state C is configured for the TCI field 114. For DMRS type 2 and if the maximum number/length of DMRS is 2 and/or the number of codewords is 1, the TCI field 124 and the DMRS ports may be indicated by the field of antenna port(s) carried in the DCI 115 according to following Table II-D-1. In Table II-D-1, the TCI field 124 is referred to as a second TCI state more generally. It is to be understood that the specific values of the indicated value of C for TCI state #1 is only an example, without any limitation on the embodiments of the present disclosure. The values indicated for TCI state #1 may have any suitable values from {A,B,C,D,E,F,G,H} in other embodiments.

In some embodiments, it is also possible that, for DMRS type 2 and if the maximum number/length of DMRS is 2 and/or the number of codewords is 1, the corresponding table for indication of at least one of the number of DMRS CDM group(s) without data, the number of front-loaded DMRS symbols, the number of DMRS port(s), the index(es) for DMRS port(s) and the value of the second TCI state is a subset of Table II-D-1. In some embodiments, there may be no column of the number of front-loaded DMRS symbols in the table, for example, when the number of front-loaded DMRS symbol is fixed to be 1 or fixed to be 2. In some embodiments, there may be no column of the number of DMRS CDM group(s) without data in the table. In some embodiments, the number of DMRS CDM group(s) without data may be fixed to be 1 or fixed to be 2 or fixed to be 3. In some embodiments, the value of the number of DMRS CDM group(s) without data may not be 1.

In some embodiments, the DMRS port(s) may be a subset of {(0-2), (0-3), (0,2), (3-5)} in the table. In some embodiments, the DMRS port(s) may be some other configuration, and in the configuration, there are more than one DMRS ports. Within the more than one DMRS ports, at least two DMRS ports are multiplexed with FDM and/or TDM. In some embodiments, the DMRS port(s) may be some other configuration, and in the configuration, there are more than one DMRS ports. Within the more than one DMRS ports, at least two DMRS ports are from different DMRS groups. For example, at least one DMRS port is from DMRS group $G_1$, and at least one DMRS port is from DMRS group $G_2$.

In some embodiments, the values of the second TCI state may be a subset of {A,B,C,D,E,F,G,H} in the table. In some embodiments, for different configurations of DMRS port(s), the numbers of values of the second TCI state may be different. In some embodiments, if the number of indications (where the indications are not "reserved") is R, the bits for the table is ceil($\log_2(R)$). In some embodiments, for different configurations of DMRS port(s), the numbers of values of the second TCI state may be different.

TABLE II-D-1

Antenna port(s) (1000 + DMRS port), dmrs-Type = 2, maxLength = 2
One or two Codewords

| Value | Number of DMRS CDM group(s) without data | DMRS port(s) | Number of front-load symbols | Second TCI state |
|---|---|---|---|---|
| 0 | 2 | 0-2 | 1 | A |
| 1 | 2 | 0-2 | 1 | B |
| 2 | 2 | 0-2 | 1 | D |
| 3 | 2 | 0-2 | 1 | E |
| 4 | 2 | 0-2 | 1 | F |
| 5 | 2 | 0-2 | 1 | G |
| 6 | 2 | 0-2 | 1 | H |
| 7 | 2 | 0-3 | 1 | A |
| 8 | 2 | 0-3 | 1 | B |
| 9 | 2 | 0-3 | 1 | D |
| 10 | 2 | 0-3 | 1 | E |
| 11 | 2 | 0-3 | 1 | F |
| 12 | 2 | 0-3 | 1 | G |
| 13 | 2 | 0-3 | 1 | H |
| 14 | 2 | 0, 2 | 1 | A |
| 15 | 2 | 0, 2 | 1 | B |
| 16 | 2 | 0, 2 | 1 | D |
| 17 | 2 | 0, 2 | 1 | E |
| 18 | 2 | 0, 2 | 1 | F |
| 19 | 2 | 0, 2 | 1 | G |
| 20 | 2 | 0, 2 | 1 | H |
| 21 | 3 | 0-2 | 1 | A |
| 22 | 3 | 0-2 | 1 | B |
| 23 | 3 | 0-2 | 1 | D |
| 24 | 3 | 0-2 | 1 | E |
| 25 | 3 | 0-2 | 1 | F |
| 26 | 3 | 0-2 | 1 | G |
| 27 | 3 | 0-2 | 1 | H |
| 28 | 3 | 0-3 | 1 | A |
| 29 | 3 | 0-3 | 1 | B |
| 30 | 3 | 0-3 | 1 | D |
| 31 | 3 | 0-3 | 1 | E |
| 32 | 3 | 0-3 | 1 | F |
| 33 | 3 | 0-3 | 1 | G |
| 34 | 3 | 0-3 | 1 | H |
| 35 | 3 | 3-5 | 1 | A |
| 36 | 3 | 3-5 | 1 | B |
| 37 | 3 | 3-5 | 1 | D |
| 38 | 3 | 3-5 | 1 | E |
| 39 | 3 | 3-5 | 1 | F |
| 40 | 3 | 3-5 | 1 | G |
| 41 | 3 | 3-5 | 1 | H |
| 42-63 | Reserved | Reserved | Reserved | Reserved |

As a specific example, the TCI states may be up to 8 (for example, TCI state {A,B,C,D,E,F,G,H}). For example, TCI state C is configured for the TCI field 114. For DMRS type 2 and if the maximum number/length of DMRS is 2 and/or the number of codewords is 2, the TCI field 124 and the DMRS ports may be indicated by the field of antenna port(s) carried in the DCI 115 according to following Table II-D-2. In Table II-D-2, the TCI field 124 is referred to as a second TCI state more generally. It is to be understood that the specific values of the indicated value of C for TCI state #1 is only an example, without any limitation on the embodiments of the present disclosure. The values indicated for TCI state #1 may have any suitable values from {A,B,C,D,E,F,G,H} in other embodiments.

In some embodiments, it is also possible that, for DMRS type 2 and if the maximum number/length of DMRS is 2 and/or the number of codewords is 2, the corresponding table for indication of at least one of the number of DMRS CDM group(s) without data, the number of front-loaded DMRS symbols, the number of DMRS port(s), the index(es) for DMRS port(s) and the value of the second TCI state is a subset of Table II-D-2. In some embodiments, there may be no column of the number of front-loaded DMRS symbols in the table, for example, when the number of front-loaded DMRS symbol is fixed to be 1 or fixed to be 2. In some embodiments, there may be no column of the number of DMRS CDM group(s) without data in the table. In some embodiments, the number of DMRS CDM group(s) without data may be fixed to be 1 or fixed to be 2 or fixed to be 3. In some embodiments, the value of the number of DMRS CDM group(s) without data may not be 1.

In some embodiments, the DMRS port(s) may be a subset of {(0-4), (0-5), (0,1,2,3,6), (0,1,2,3,6,8), (0,1,2,3,6,7,8), (0,1,2,3,6,7,8,9)} in the table. In some embodiments, the DMRS port(s) may be some other configuration, and in the configuration, there are more than one DMRS ports. Within the more than one DMRS ports, at least two DMRS ports are multiplexed with FDM and/or TDM. In some embodiments, the DMRS port(s) may be some other configuration, and in the configuration, there are more than one DMRS ports. Within the more than one DMRS ports, at least two DMRS ports are from different DMRS groups. For example, at least one DMRS port is from DMRS group $G_1$, and at least one DMRS port is from DMRS group $G_2$.

In some embodiments, the values of the second TCI state may be a subset of {A,B,C,D,E,F,G,H} in the table. In some embodiments, for different configurations of DMRS port(s), the numbers of values of the second TCI state may be different. In some embodiments, if the number of indications (where the indications are not "reserved") is R, the bits for the table is ceil($\log_2(R)$). In some embodiments, the number of bits for Table II-D-2 is same as the number of bits for Table II-D-1, that is, the table where DMRS type is 2, the maximum number/length of DMRS is 2 and the number of codewords is 1. In some embodiments, for different configurations of DMRS port(s), the numbers of values of the second TCI state may be different. In some embodiments, T may be 63 or 31 or 15.

TABLE II-D-2

Antenna port(s) (1000 + DMRS port), dmrs-Type = 2, maxLength = 2
One or Two Codewords:

| Value | Number of DMRS CDM group(s) without data | DMRS port(s) | Number of front-load symbols | Second TCI state |
|---|---|---|---|---|
| 0 | 3 | 0-4 | 1 | A |
| 1 | 3 | 0-4 | 1 | B |
| 2 | 3 | 0-4 | 1 | D |
| 3 | 3 | 0-4 | 1 | E |
| 4 | 3 | 0-4 | 1 | F |
| 5 | 3 | 0-4 | 1 | G |
| 6 | 3 | 0-4 | 1 | H |
| 7 | 3 | 0-5 | 1 | A |
| 8 | 3 | 0-5 | 1 | B |
| 9 | 3 | 0-5 | 1 | D |
| 10 | 3 | 0-5 | 1 | E |
| 11 | 3 | 0-5 | 1 | F |
| 12 | 3 | 0-5 | 1 | G |
| 13 | 3 | 0-5 | 1 | H |
| 14 | 2 | 0, 1, 2, 3, 6 | 2 | A |
| 15 | 2 | 0, 1, 2, 3, 6 | 2 | B |
| 16 | 2 | 0, 1, 2, 3, 6 | 2 | D |
| 17 | 2 | 0, 1, 2, 3, 6 | 2 | E |
| 18 | 2 | 0, 1, 2, 3, 6 | 2 | F |
| 19 | 2 | 0, 1, 2, 3, 6 | 2 | G |
| 20 | 2 | 0, 1, 2, 3, 6 | 2 | H |
| 21 | 2 | 0, 1, 2, 3, 6, 8 | 2 | A |
| 22 | 2 | 0, 1, 2, 3, 6, 8 | 2 | B |
| 23 | 2 | 0, 1, 2, 3, 6, 8 | 2 | D |
| 24 | 2 | 0, 1, 2, 3, 6, 8 | 2 | E |
| 25 | 2 | 0, 1, 2, 3, 6, 8 | 2 | F |
| 26 | 2 | 0, 1, 2, 3, 6, 8 | 2 | G |
| 27 | 2 | 0, 1, 2, 3, 6, 8 | 2 | H |
| 28 | 2 | 0, 1, 2, 3, 6, 7, 8 | 1 | A |
| 29 | 2 | 0, 1, 2, 3, 6, 7, 8 | 1 | B |
| 30 | 2 | 0, 1, 2, 3, 6, 7, 8 | 1 | D |
| 31 | 2 | 0, 1, 2, 3, 6, 7, 8 | 1 | E |
| 32 | 2 | 0, 1, 2, 3, 6, 7, 8 | 1 | F |
| 33 | 2 | 0, 1, 2, 3, 6, 7, 8 | 1 | G |
| 34 | 2 | 0, 1, 2, 3, 6, 7, 8 | 1 | H |
| 35 | 2 | 0, 1, 2, 3, 6, 7, 8, 9 | 1 | A |
| 36 | 2 | 0, 1, 2, 3, 6, 7, 8, 9 | 1 | B |
| 37 | 2 | 0, 1, 2, 3, 6, 7, 8, 9 | 1 | D |
| 38 | 2 | 0, 1, 2, 3, 6, 7, 8, 9 | 1 | E |
| 39 | 2 | 0, 1, 2, 3, 6, 7, 8, 9 | 1 | F |
| 40 | 2 | 0, 1, 2, 3, 6, 7, 8, 9 | 1 | G |
| 41 | 2 | 0, 1, 2, 3, 6, 7, 8, 9 | 1 | H |
| 42-63 | Reserved | Reserved | Reserved | Reserved |

TABLE II-D-2-continued

It is noted that Table II-A-1 regards DMRS type 1 as defined in the 3GPP specifications. With the grouping of the DMRS ports into different DMRS groups, there are some possible DMRS port(s) indicated by the field of antenna port(s) cannot be used in the multi-TRP commination. Therefore, compared with Table I-A, Table II-A-1 only includes four possible DMRS port(s) indications, and they are DMRS ports {0-2}, DMRS ports {0-3}, DMRS ports {0,2}, and DMRS ports {0,2,4,6}. For each of the possible DMRS port(s) indications, except for the instance that TCI field 124 is identical to the TCI field 114, there are seven possible TCI states left for TCI field 124 to be indicated, which is shown in Table II-A-1 by capital latters A-G.

In this manner, the network device 110 may indicate the TCI state 124 in the same field of antenna port(s) as the selected DMRS port(s) for transmitting the DMRSs. For example, as shown in Table II-A-1, if the field of antenna port(s) has a value of 10, the selected DMRS port(s) by the network devices 110, 120 for transmitting DMRSs 125, 135 are DMRS ports 0-3, and the TCI state 124 for the DMRS group 122 is state "E."

For DMRS type 2 as defined in the 3GPP specifications, it is understood that if the first DMRS group includes DMRS ports {0,1,6,7} and another DMRS group includes DMRS ports {2,3,8,9,4,5,10,11}, there are also some indications for DMRS ports cannot be used if there are different TCI states, e.g. for multi-TRP/panel communication. Accordingly, the TCI field 124 and the selected DMRS port(s) for transmitting the DMRSs may also be indicated by a single indication likewise.

In some embodiments, if the first DMRS group $G_1$ includes DMRS ports {0,1,6,7} and the second DMRS group $G_2$ includes DMRS ports {2,3,8,9,4,5,10,11}, some of the configurations of DMRS ports may not be used when two different values of TCI states are configured for the two DMRS groups. For example, the indication of DMRS ports (0,1,2,3,4,5) may not be used when two different values of TCI states are configured for the two DMRS groups. For another example, the indication of DMRS ports (3,4,5) may not be used when two different values of TCI states are configured for the two DMRS groups.

In some embodiments, if the first DMRS group $G_1$ includes DMRS ports {0,1,6,7, 4,5,10,11} and the second DMRS group $G_2$ includes DMRS ports {2,3,8,9}, some of the configurations of DMRS ports may not be used when two different values of TCI states are configured for the two DMRS groups. For example, the indication of DMRS ports (0,1,2,3,4,5) may not be used when two different values of TCI states are configured for the two DMRS groups.

In some embodiments, if the first DMRS group $G_1$ includes DMRS ports {0,1,6,7, 2,3,8,9} and the second DMRS group $G_2$ includes DMRS ports {4,5,10,11}, some of the configurations of DMRS ports may not be used when two different values of TCI states are configured for the two DMRS groups. For example, the indication of DMRS ports (0,1,2,3) may not be used when two different values of TCI states are configured for the two DMRS groups. For another example, the indication of DMRS ports (0,2) may not be used when two different values of TCI states are configured for the two DMRS groups.

For another example, the indication of DMRS ports (0,1,2) may not be used when two different values of TCI states are configured for the two DMRS groups. For another example, the indication of DMRS ports (0,1,2,3,4) may not be used when two different values of TCI states are configured for the two DMRS groups. For another example, the indication of DMRS ports (0,1,2,3,4,5) may not be used when two different values of TCI states are configured for the two DMRS groups.

For another example, the indication of DMRS ports (0,1,2,3,6) may not be used when two different values of TCI states are configured for the two DMRS groups. For another example, the indication of DMRS ports (0,1,2,3,6,8) may not be used when two different values of TCI states are configured for the two DMRS groups. For another example, the indication of DMRS ports (0,1,2,3,6,7,8) may not be used when two different values of TCI states are configured for the two DMRS groups. For another example, the indication of DMRS ports (0,1,2,3,6,7,8,9) may not be used when two different values of TCI states are configured for the two DMRS groups.

In some embodiments, for above indications, if two different values of the TCI states are configured for the two DMRS groups, only one of the two values of TCI state may be assumed to the two DMRS groups. For example, the first TCI state value or the second TCI state value may be assumed.

In some embodiments, a terminal device is configured with two TCI states (for example, TCI state #1 and TCI state #2) in one DCI. In some embodiments, TCI state #1 may be selected from TCI group X (for example, TCI group X includes TCI states $X_0, X_1, \ldots X_{w-1}$). There may be up to W TCI states within TCI group X In some embodiments, TCI state #2 may be selected from TCI group Y. There may be up to V TCI states within TCI group Y (for example, TCI group Y includes TCI states $Y_0, Y_1, \ldots Y_{v-1}$). In some embodiments, TCI group Y for TCI state #2 may be a subset of TCI group X for TCI state #1. That is, V≤W, and each value of $Y_1$ in TCI group Y is included in TCI group X.

In some embodiments, in the DCI there may be two fields (TCI field #1 and TCI field #2) to indicate the value of two TCI states (TCI state #1 and TCI state #2), respectively. In some embodiments, the number of bits in the TCI field #2 may be less than the number of bits in the TCI field #1. In some embodiments, the number of possible values for TCI state #2 may be less than the number of possible values for TCI state #1. In some embodiments, the number of bits in the TCI field #1 to indicate TCI state #1 may be ceil($\log_2$(W)).

For example, W may be 1 or 2 or 4 or 8, and the number of bits to indicate TCI state #1 and/or TCI state #2 may be 0 or 1 or 2 or 3, respectively. For another example, the number of bits to indicate TCI state #1 may be fixed to be 3, and in the TCI group, the number of TCI states W may be no more than 8. For another example, the number of bits to indicate TCI state #1 may be fixed to be 2, and in the TCI group, the number of TCI states W may be no more than 4. For another example, the number of bits to indicate TCI state #1 and/or TCI state #2 may be fixed to be 1, and in the TCI group, the number of TCI states W may be no more than 2.

In some embodiments, the number of bits in TCI field #2 to indicate TCI state #2 may be ceil($\log_2$(V+1)). There may be V+1 indexes to indicate different values of TCI state #2, and within the V+1 indexes, there is one index (for example, index "000" or index "0") to indicate the value of TCI state #2 which is same as the value of TCI state #1. Other V indexes are used to indicate the value of TCI states within TCI group Y (for example, TCI group Y includes TCI states $Y_0, Y_1, \ldots Y_{v-1}$).

For example, V may be any one of {1,2,3,4,5,6,7}, and the number of bits to indicate TCI state #2 may be 0 or 1 or 2 or 3, respectively. For another example, the number of bits to indicate TCI state #2 may be fixed to be 3, and in the TCI group, the number of TCI states V+1 may be no more than 8. For another example, the number of bits to indicate TCI state #2 may be fixed to be 2, and in the TCI group, the number of TCI states V+1 may be no more than 4. For another example, the number of bits to indicate TCI state #2 may be fixed to be 1, and in the TCI group, the number of TCI states V+1 may be no more than 2.

In some embodiments, the number of possible values of TCI states in one DCI is no more than 8. The possible values of TCI states is selected from TCI group X, for example, X is a subset of {A, B, C, D, E, F, G, H}). In some embodiments, the set of {A,B,C,D,E,F,G,H} may be divided into two sub-groups. For example, a first sub-group S1 of TCI states may be a subset of {A, B, C, D}, and a second sub-group S2 of TCI states may a subset of {E, F, G, H}. In some embodiments, a terminal device is configured with two TCI states (for example, TCI state #1 and TCI state #2) in one DCI. In some embodiments, TCI state #1 may be indicated with a value from TCI group X TCI state #2 may be indicated with a value from sub-group S1 or sub-group S2. Whether TCI state #2 is indicated with a value from sub-group S1 or sub-group S2 depends on the indicated value of TCI state #1. For example, if the indicated value of TCI state #1 is not within sub-group S1, then TCI state #2 is indicated with a value from sub-group S1. For another example, if the indicated value of TCI state #1 is not within sub-group S2, then TCI state #2 is indicated with a value from sub-group S2.

In some embodiments, the maximum number of orthogonal DMRS ports per terminal device for multi-user scheduling may be more than 4. In some embodiments, two DMRS groups (for example, DMRS group $G_1$ and DMRS group $G_2$) are configured for a terminal device, and two different values of TCI states are configured for the terminal device. In some embodiments, the number of orthogonal DMRS ports (where the orthogonal DMRS ports are configured for the terminal device and the orthogonal DMRS ports are included in DMRS group $G_1$) is not greater than 4. The terminal device may not assume that all the remaining orthogonal DMRS ports within DMRS group $G_1$ (except for the DMRS ports configured for the terminal device) are not associated with transmission of PDSCH to another terminal device. In some embodiments, the number of orthogonal DMRS ports (where the orthogonal DMRS ports are configured for the terminal device and the orthogonal DMRS ports are included in DMRS group $G_2$) is not greater than 4. The terminal device may not assume that all the remaining orthogonal DMRS ports within DMRS group $G_2$ (except for the DMRS ports configured for the terminal device) are not associated with transmission of PDSCH to another terminal device.

Figure 3:
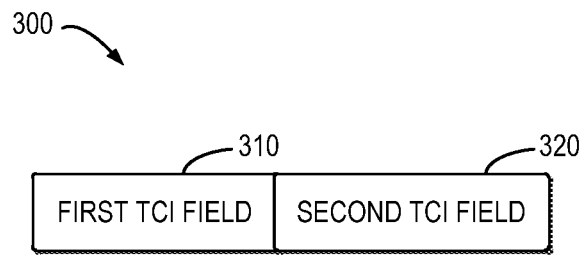
FIG. 3 shows an example of a plurality of TCI fields in accordance with some embodiments of the present disclosure.

More generally, the network device 110 may indicate the TCI states 114, 124 using two TCI fields in the DCI 115. In this regard, FIG. 3 shows an example 300 of a plurality of TCI fields 310 and 320 in accordance with some embodiments of the present disclosure. The fields 310 and 320 may also be referred to as two bitmaps 310 and 320, and the bitmap 320 has fewer bits than the bitmap 310. In this way, different TCI states for a plurality of network devices may be flexibly indicated and easy to extend.

With the bitmaps 310 and 320, the network device 110 may indicate a particular TCI state of the TCI state 114 using a value of the bitmap 310. For example, if there are eight possible TCI states for the TCI state 114, the bitmap 310 may include 3 bits. If there are 16 possible TCI states for the TCI state 114, the bitmap 310 may include 4 bits, and so on. With respect to the bitmap 320, its predetermined value may indicate that the TCI state 124 is identical to the TCI state 114. Other values of the bitmap 320 different from the predetermined value may indicate a particular TCI state.

Figure 4:
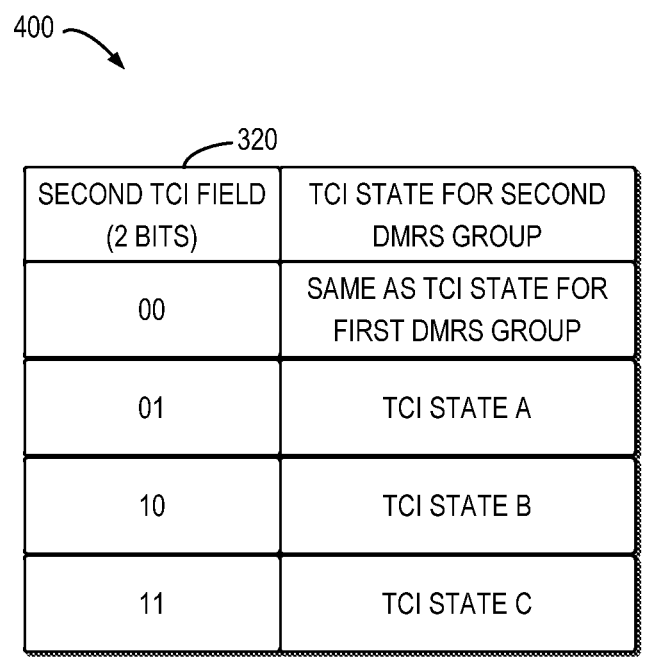
FIG. 4 shows an example of a second TCI field with two bits in accordance with some embodiments of the present disclosure.

FIG. 4 shows an example 400 of a second TCI field 320 with two bits in accordance with some embodiments of the present disclosure. For example, this may be the case that the number of possible TCI states to be indicated for TCI state 124 is less than 3. This means that the bitmap 320 can be reduced to two bits. In the example 400, if the value of the second TCI field 310 is "00," the TCI state 124 may be identical to the TCI state 114, if the value of the second TCI field 310 is "01," the TCI state 124 may be TCI state "A," if the value of the second TCI field 310 is "10," the TCI state 124 may be TCI state "B," and if the value of the second TCI field 310 is "11," the TCI state 124 may be TCI state "C."

It is to be understood that the specific values of the second TCI field 310 and the specific TCI states A-C are only examples without any limitation on the embodiments of the present disclosure. The values of the second TCI field 310 and the indicated TCI states may have any suitable corresponding relations in other embodiments.

In some embodiments, for determining the TCI states 114 and 124, the network device 110 may divide all the potential TCI states (such as TCI states A-H) for the DMRS groups into different groups of TCI states. For example, a first group of TCI states may include {A, B, C, D}, and a second group of TCI states may include {E, F, G, H}. It is appreciated that various other dividing manners are possible. In other embodiments, this grouping of the TCI states may also be performed by other entities in the communication network, for example, by a higher layer entity.

For the TCI state 114, the network device 110 may select from all the potential TCI states (such as TCI states A-H) from all the groups of TCI states. Then, for TCI state 124, the network device 110 may select a possible TCI state from a group different from the group comprising the TCI state 114. For example, if the TCI state 114 is TCI state A from the first group of the TCI states, the TCI state 124 is selected from the second group of the TCI states.

In other words, if two or more DMRS groups are configured in a higher layer, the TCI states can also be grouped to two or more groups in higher layer, and/or in the MAC CE, up to 8 TCI states can be mapped, for example. For this case, for TCI state 114, up to 8 TCI states can be mapped, and for TCI state 124, up to K TCI states can be mapped, for example, K<=8. In this way, the possible TCI states of the TCI state 124 for the DMRS group 122 of the network device 120 may be decreased, and thus the overhead for indicating TCI state 124 may be reduced.

Referring back to FIG. 2, the network device 110 may transmit 215 the DCI 115 to the terminal device 130, so that the terminal device 130 can later receive the DMRSs 125, 135 from network devices 110, 120 on the DMRS ports selected by the network devices 110, 120 based on the TCI states 114, 124. In some embodiments, the DCI 115 may be carried in a PDCCH from the network device 110 to the terminal device 130.

In some embodiments of the present disclosure, a solution of layer mapping for multi-TRP communication is also proposed. In general, channel-encoded bits originating from a same block of information bits is typically referred to as a "codeword." This is also to the terminology used in the LTE specifications to describe the output intended for a particular subframe from a single HARQ process serving a particular transport block and is the result of processing the information bits by performing, for example, turbo encoding, rate matching, interleaving, etc. Another interesting feature of LTE is its support for multiple antennas at both the transmit side and the receive side. In a multiple transmit antenna device or system, the resulting codewords are then modulated and distributed over the transmit antennas for transmission. The first modulated codeword may, for example, be mapped to the first two transmit antennas, and the second modulated codeword may be mapped to the two remaining transmit antennas in a four transmit antenna system.

In addition, precoding is a popular technique used in conjunction with multi-antenna transmission. The basic principle involved in precoding is to mix and distribute the modulation symbols over the antennas while potentially also taking the current channel conditions into account. Precoding can be implemented by, for example, multiplying the information carrying symbol vector containing modulation symbols by a matrix which is selected to match the channel. Sequences of symbol vectors thus form a set of parallel symbol streams and each such symbol stream is typically referred to as a "layer." Thus, depending on the choice of precoder in a particular implementation, a layer may directly correspond to a certain antenna or a layer may, via the precoder mapping, be distributed onto several antennas (also known as antenna ports). The mechanism by which codewords are assigned to particular layers in such systems is referred to as "mapping" or, more specifically, as "codeword to layer mapping."

As mentioned, there are different DMRS groups for a plurality of network devices in the multi-TRP communication. Therefore, it is desirable to map one codeword to a spatial layer related to DMRS ports in one DMRS group when performing layer mapping. Accordingly, in performing layer mapping for multi-TRP communication scenario, the network device 110 may map a codeword to a spatial layer related to DMRS ports in one DMRS group of the DMRS groups. To this end, more indications of layer mapping of different codewords may be introduced for multi-TRP communication. In this way, the performance of the multi-TRP communication may be improved, since a same codeword are mapped to a layer related to DMRS ports which are quasi co-located with each other.

In some embodiments, a terminal device may be configured with a DMRS type and/or a maximum number/length of DMRS and/or a number of codewords. If the terminal device is configured with a given DMRS type and a given value of the maximum number/length of DMRS and 2 codewords (for example, CW #0 and CW #1), there is one corresponding Table Q for indication of at least one of antenna ports, the number of DMRS CDM group(s) without data, the number of front-loaded DMRS symbols, the number of DMRS port(s), and the index(es) for DMRS port(s).

In some embodiments, for a given number of DMRS CDM group(s) without data, a given number of DMRS ports (for example, the number is L, where L is an integer and L>=1), a given indexes for DMRS ports (for example, $\{P_1,$ $P_2, P_3, \ldots P_L\}$), and/or a given number of front-loaded DMRS ports, the configured DMRS ports (for example, $\{P_1, P_2, P_3, \ldots P_L\}$) are included within two DMRS groups (for example, DMRS group $G_1$ and DMRS group $G_2$).

In some embodiments, only one TCI state or two same TCI states are configured for the two DMRS groups. For the given number of DMRS CDM group(s) without data, the given number of DMRS ports (for example, the number is L, where L is an integer and L>=1), the given indexes for DMRS ports (for example, $\{P_1, P_2, P_3, \ldots P_L\}$), and/or the given number of front-loaded DMRS ports, the layer mapping is mapping scheme A, the two codewords are mapped with increasing order based on the configured DMRS ports $\{P_1, P_2, P_3, \ldots P_L\}$. That is, CW #0 is mapped to ports $\{P_1, P_2, \ldots P_{\lfloor L/2 \rfloor}\}$, and CW #1 is mapped to ports $\{P_{\lfloor L/2 \rfloor+1}, P_{\lfloor L/2 \rfloor+2}, \ldots P_L\}$.

In some embodiments, two different TCI states are configured for the two DMRS groups. For the given number of DMRS CDM group(s) without data, the given number of DMRS ports (for example, the number is L, where L is an integer and L>=1), the given indexes for DMRS ports (for example, $\{P_1, P_2, P_3, \ldots P_L\}$), and/or the given number of front-loaded DMRS ports, the layer mapping is mapping scheme B, each codeword is mapped to the DMRS ports within increasing order based on the configured DMRS ports $\{P_1, P_2, P_3, \ldots P_L\}$, and the DMRS ports are within one DMRS group. For example, CW #0 is mapped to ports included in DMRS group $G_1$, and CW #1 is mapped to ports included in DMRS group $G_2$.

In some embodiments, within Table Q, there may be two values/indexes/indications indicating a same value of the number of DMRS CDM group(s) without data, a same value of the number of DMRS port(s), same index(es) for DMRS port(s), and/or a same value of the number of front-loaded DMRS symbols. The two values/indexes/indications indicating the same value of the number of DMRS CDM group(s) without data, the same value of the number of DMRS port(s), same index(es) for DMRS port(s), and/or the same value of the number of front-loaded DMRS symbols in Table Q are used to indicate two different layer mapping schemes (layer mapping A and layer mapping B).

In some embodiments, for DMRS type 1 and for indication with DMRS ports 0-4, if two different TCI states are configured, CW #0 may be mapped to DMRS ports {2, 3}, and CW #1 may be mapped to DMRS ports {0, 1, 4}. If only one TCI state or two same TCI states are configured, CW #0 may be mapped to DMRS ports {0,1}, and CW #1 may be mapped to DMRS ports {2, 3, 4}.

In some embodiments, for DMRS type 1 and/or DMRS type 2 and for indication with DMRS ports (0,1,2), if two different TCI states are configured, CW #0 may be mapped to DMRS ports {2}, and CW #1 may be mapped to DMRS ports {0, 1}. If only one TCI state or two same TCI states are configured, CW #0 may be mapped to DMRS ports {0}, and CW #1 may be mapped to DMRS ports {1,2}.

In some embodiments, for DMRS type 1 and for indication with DMRS ports (0,1,2,3,4,6), if two different TCI states are configured, CW #0 may be mapped to DMRS ports {0,1,4}, and CW #1 may be mapped to DMRS ports {2,3,6}. If only one TCI state or two same TCI states are configured, CW #0 may be mapped to DMRS ports {0,1,2}, and CW #1 may be mapped to DMRS ports {3,4,6}.

In some embodiments, for DMRS type 1 and for indication with DMRS ports (0,1,2,3,4,5,6), if two different TCI states are configured, CW #0 may be mapped to DMRS ports {2,3,6}, and CW #1 may be mapped to DMRS ports {0,1,4,5}. If only one TCI state or two same TCI states are configured, CW #0 may be mapped to DMRS ports {0,1,2}, and CW #1 may be mapped to DMRS ports {3,4,5,6}.

In some embodiments, for DMRS type 1 and for indication with DMRS ports (0,1,2,3,4,5,6,7), if two different TCI states are configured, CW #0 may be mapped to DMRS ports {0,1,4,5}, and CW #1 may be mapped to DMRS ports {2,3,6,7}. If only one TCI state or two same TCI states are configured, CW #0 may be mapped to DMRS ports {0,1,2,3}, and CW #1 may be mapped to DMRS ports {4,5,6,7}.

In some embodiments, for DMRS type 2 and for indication with DMRS ports (3,4,5), if two different TCI states are configured, CW #0 may be mapped to DMRS ports {5}, and CW #1 may be mapped to DMRS ports {3,4}. If only one TCI state or two same TCI states are configured, CW #0 may be mapped to DMRS ports {3}, and CW #1 may be mapped to DMRS ports {4,5}.

In some embodiments, for DMRS type 2 and for indication with DMRS ports (0,1,2,3,4), if two different TCI states are configured, CW #0 may be mapped to DMRS ports {2,3}, and CW #1 may be mapped to DMRS ports {0,1,4}. If only one TCI state or two same TCI states are configured, CW #0 may be mapped to DMRS ports {0,1}, and CW #1 may be mapped to DMRS ports {2,3,4}.

In some embodiments, for DMRS type 2 and for indication with DMRS ports (0,1,2,3,4,5), if two different TCI states are configured, CW #0 may be mapped to DMRS ports {0,1}, and CW #1 may be mapped to DMRS ports {2,3,4,5}. Alternatively, if two different TCI states are configured, CW #0 may be mapped to DMRS ports {2,3}, and CW #1 may be mapped to DMRS ports {0,1,4,5}. If only one TCI state or two same TCI states are configured, CW #0 may be mapped to DMRS ports {0,1,2}, and CW #1 may be mapped to DMRS ports {3,4,5}.

In some embodiments, for DMRS type 2 and for indication with DMRS ports (0,1,2,3,6), if two different TCI states are configured, CW #0 may be mapped to DMRS ports {2,3}, and CW #1 may be mapped to DMRS ports {0,1,6}. If only one TCI state or two same TCI states are configured, CW #0 may be mapped to DMRS ports {0,1}, and CW #1 may be mapped to DMRS ports {2,3,6}.

In some embodiments, for DMRS type 2 and for indication with DMRS ports (0,1,2,3,6,8), if two different TCI states are configured, CW #0 may be mapped to DMRS ports {0,1,6}, and CW #1 may be mapped to DMRS ports {2,3,8}. If only one TCI state or two same TCI states are configured, CW #0 may be mapped to DMRS ports {0,1,2}, and CW #1 may be mapped to DMRS ports {3,6,8}.

In some embodiments, for DMRS type 2 and for indication with DMRS ports (0,1,2,3,6,7,8), if two different TCI states are configured, CW #0 may be mapped to DMRS ports {2,3,8}, and CW #1 may be mapped to DMRS ports {0,1,6,7}. If only one TCI state or two same TCI states are configured, CW #0 may be mapped to DMRS ports {0,1,2}, and CW #1 may be mapped to DMRS ports {3,6,7,8}.

In some embodiments, for DMRS type 2 and for indication with DMRS ports (0,1,2,3,6,7,8,9), if two different TCI states are configured, CW #0 may be mapped to DMRS ports {0,1,6,7}, and CW #1 may be mapped to DMRS ports {2,3,8,9}. If only one TCI state or two same TCI states are configured, CW #0 may be mapped to DMRS ports {0,1,2,3}, and CW #1 may be mapped to DMRS ports {6,7,8,9}.

For example, if two DMRS groups are configured and there are different TCI states for the two DMRS groups, the codeword to layer mapping in the DMRS Tables (for example, Table I-A, Table I-B, Table I-C, Table I-D, Table Q1, Table Q2-A, Table Q2-B, Table II-A-1, Table II-A-2, Table II-B-1, Table II-C-1, Table II-C-2, Table II-D-1 and Table II-D-2) may have different interpretations. In particular, for DMRS type 1, for indication with DMRS ports 0-4, if there is one single TCI state and/or one single DMRS group, the mapping manner as defined in current specifications may be used, and if there are two different TCI states, then the mapping manner should be DMRS ports {2, 3} for one codeword, and DMRS ports {0, 1, 4} for another codeword. This will be further detailed with reference to the "Part of Table II" below.

Part of Table II
Antenna port(s) (1000 + DMRS port), dmrs-Type = 1, maxLength = 2
Two Codewords:
Codeword 0 enabled,
Codeword 1 enabled

| Value | Number of DMRS CDM group(s) without data | DMRS port(s) | Number of front-load symbols |
|---|---|---|---|
| 0 | 2 | 0-4 | 2 |
| 1 | 2 | 0, 1, 2, 3, 4, 6 | 2 |
| 2 | 2 | 0, 1, 2, 3, 4, 5, 6 | 2 |
| 3 | 2 | 0, 1, 2, 3, 4, 5, 6, 7 | 2 |
| 4-31 | reserved | reserved | reserved |

As shown, if the value of the field of the antenna port(s) is 0, the DMRS ports are 0-4. The two DMRS groups are DMRS ports {0,1,4,5} and DMRS ports {2,3,6,7}. Thus, for a single TCI state, Codeword 0 may be mapped to a spatial layer related to DMRS ports 0 and 1, and Codeword 1 may be mapped to a spatial layer related to DMRS ports 2, 3, and 4. If there are two TCI states for two DMRS groups, Codeword 0 may be mapped to a spatial layer related to DMRS ports 2 and 3, and Codeword 1 may be mapped to a spatial layer related to DMRS ports 0, 1, and 4. In this way, it is ensured that a same codeword is mapped onto a layer related to DMRS ports from a same DMRS group. An example for DMRS type 2 is described with reference to Table III below.

TABLE III

Antenna port(s) (1000 + DMRS port), dmrs-Type = 2, maxLength = 1
Two codewords:
Codeword 0 enabled,
Codeword 1 enabled

| Value | Number of DMRS CDM group(s) without data | DMRS port(s) |
|---|---|---|
| 0 | 3 | 0-4 |
| 1 | 3 | 0-5 |
| 2-31 | reserved | Reserved |

As shown, if the value of the field of the antenna port(s) is 1, the DMRS ports are 0-5. As discussed above, for DMRS type 2, one DMRS group may include DMRS ports {0,1,6,7}, another DMRS group may include DMRS ports {2,3,8,9}, and DMRS ports {4,5,10,11} can only be added in one group. Thus, for a single TCI, Codeword 0 may be mapped to a spatial layer related to DMRS ports 0, 1, and 2, and Codeword 1 may be mapped to a spatial layer related to DMRS ports 3, 4, and 5. If there are two TCI state for two DMRS groups, Codeword 0 may be mapped to a spatial layer related to DMRS ports 2 and 3, and Codeword 1 may be mapped to a spatial layer related to DMRS ports 0, 1, 4, and 5. Alternatively, Codeword 0 may be mapped to a spatial layer related to DMRS ports 0 and 1, and Codeword 1 may be mapped to a spatial layer related to DMRS ports 2, 3, 4, and 5. In other embodiments, the layer mapping with DMRS type 2 may not be used for multi-TRP communication.

Continued with FIG. 2, the terminal device 130 receives 215 the DCI 115 from the network device 110, for example, via a PDCCH. In other embodiments, the terminal device 130 may receive the DCI from any combination of the network devices in communication with the terminal device 130.

As discussed above, the network device 110 has indicated in the DCI 115 the TCI states 114, 124 and the DMRS ports for transmitting DMRSs 125, 135. Correspondingly, at the receiving side, the terminal device 130 determines 220, from the DCI 115, the TCI states 114, 124 for DMRS groups 112, 122 of the network devices 110, 120. The terminal device 130 also determines 220, from the DCI 115, the DMRS ports for receiving DMRSs 125, 135 transmitted by the network devices 110, 120.

If the network device 110 indicates the TCI state 114 in the DCI 115 and indicates whether the TCI state 124 is identical to the TCI state 114. Correspondingly, at the receiving side, the terminal device 130 may first determine the TCI state 114, and then determine whether the TCI state 124 is identical to the TCI state 114. If the TCI state 124 is different from the TCI state 114, the terminal device 130 may determine the TCI state 124 and the DMRS ports for receiving DMRSs 125, 135, based on a single indication in the DCI 115.

If the network device 110 sets two bitmaps 310 and 320 to indicate the TCI states 114 and 124, the terminal device 130 may obtain the two bitmaps 310 and 320. Then, the terminal device 130 determines the TCI state 114 based on a value of the bitmap 310. If the bitmap 320 has a predetermined value, the terminal device 130 determines that the TCI state 124 is identical to the TCI state 114. If the bitmap 320 has a value different from the predetermined value, the terminal device 130 determines the TCI state 124 based on the value.

The terminal device 130 receives 225, on the DMRS ports belong to the DMRS group 112 and based on the TCI state 114, the DMRSs 125 from the network device 110. Analogously, terminal device 130 receives 230, on the DMRS ports belong to the DMRS group 122 and based on the TCI state 124, the DMRSs 135 from the network device 120. If there are more network devices in communication with the terminal device 130, the DMRSs transmitted by these network devices may be received likewise.

In some embodiments of the present disclosure, a solution related to multi-TRP communication using a phase tracking reference signal (PTRS) is also proposed. In general, the most apparent transformation taking place with 5G NR is the move towards higher millimeter wave (mmWave) frequencies as a very promising approach to significantly boost the capacity of 5G. However, mmWave devices and network access points suffer from severe phase noise mainly due to the mismatch of transmitter and receiver frequency oscillators.

Basically, phase noise is caused by noise in the active components and lossy elements which is up-converted to the carrier frequency. Frequency synthesizers generally consist of a reference oscillator (or clock), a voltage controlled oscillator (VCO), and a phase-locked loop (PLL) with frequency divider, phase-frequency detector charge pump, and loop filter. In this regard, PTRS is introduced in 5G NR to tracking the phase and mitigate the performance loss due to phase noise.

If multiple TRP/panels are configured with different Crystal Oscillators (CO), two or more PTRS ports may be needed. In this case, making all layers transparent from multiple TRP/panels (like the SFN) cannot be achieved. To increase the reliability of multi-TRP/panel communication, one possible solution is dynamically increasing additional DMRS number, namely transmitting additional DMRSs on additional DMRSs ports. This may be implicitly indicated by a separate field in the DCI 115 or implicitly indicated by the indication of DMRS ports in a table, such as Tables I-III.

In some embodiments, only one DMRS group is configured for a terminal device, and two different TCI states are configured for the single DMRS group within one DCI. The terminal device may assume that the actual number of additional DMRS is 3. Alternatively, the terminal device may assume that the actual number of additional DMRS is the configured number of additional DMRS plus one.

In some embodiments, a terminal device may be configured with a DMRS type and/or the maximum number/length of DMRS and/or the number of codewords. If the terminal device is configured with a given DMRS type, a given value of the maximum number/length of DMRS and a given number of codewords, there may be a corresponding table configured for indication of at least one of antenna ports, the number of DMRS CDM group(s) without data, the number of front-loaded DMRS symbols, the number of DMRS port(s), and the index(es) for DMRS port(s).

In some embodiments, within the corresponding table, there may be U (where U is an integer and U>=1) values/indexes/indications indicating a same value of the number of DMRS CDM group(s) without data, a same value of the number of DMRS port(s), same index(es) for DMRS port(s), and/or a same value of the number of front-loaded DMRS symbols. The U values/indexes/indications indicating the same value of the number of DMRS CDM group(s) without data, the same value of the number of DMRS port(s), same index(es) for DMRS port(s), and/or the same value of the number of front-loaded DMRS symbols are used to indicate different numbers of additional DMRS and/or different layer mapping schemes.

In some embodiments, within the corresponding table, there may be two values/indexes/indications indicating a same value of the number of DMRS CDM group(s) without data, a same value of the number of DMRS port(s), same index(es) for DMRS port(s), and/or a same value of the number of front-loaded DMRS symbols. The two values/indexes/indications indicating the same value of the number of DMRS CDM group(s) without data, the same value of the number of DMRS port(s), same index(es) for DMRS port(s), and/or the same value of the number of front-loaded DMRS symbols are used to indicate whether the data in different layers is same or not.

In some embodiments, more than one layer may be configured for a terminal device.

There may be additional layer mapping scheme configured for the terminal device. For example, same data is transmitted on at least two layers. In some embodiments, the two layers correspond to two DMRS ports, and the two DMRS ports are within different DMRS group. In some embodiments, the two layers correspond to two DMRS ports, and the two DMRS ports are multiplexed with FDM and/or TDM. In some embodiments, the total number of DMRS ports configured for the terminal device is more than one and no greater than M For example, M is 2 or 3 or 4 or 5 or 6 or 7 or 8.

In some embodiments, the terminal device shall assume that complex-valued modulation symbols for each of the codewords to be transmitted are mapped onto M layers. Complex-valued modulation symbols $\{d^{(q)}(0), \ldots, d^{(q)}(M_{symb}^{(q)}-1)\}$ for codeword q shall be mapped onto the layers $x(i)=[x^{(0)}(i), \ldots, x^{(v-1)}(i)]^T$, $i=0,1, \ldots, M_{symb}^{layer}-1$, where v is the number of layers and $M_{symb}^{layer}$ is the number of modulation symbols per layer. $[\ ]^T$ is the transposition.

In some embodiments, if the number of layers is 2 and the number of codewords is 1, then the codeword to layer mapping is $x^{(0)}(i)=d^{(0)}(i)$, $x^{(1)}(i)=d^{(0)}(i)$, and $M_{symb}^{layer}=M_{symb}^{(0)}$. In some embodiments, if the number of layers is 3 and the number of codewords is 1, then the codeword to layer mapping is $x^{(0)}(i)=(d^{(0)}(i)$, $x^{(1)}(i)=d^{(0)}(i)$, $x^{(2)}(i)=d^{(0)}(i)$, and $M_{symb}^{layer}=M_{symb}^{(0)}$. In some embodiments, if the number of layers is 4 and the number of codewords is 1, then the codeword to layer mapping is $x^{(0)}(i)=d^{(0)}(i)$, $x^{(1)}(i)=d^{(0)}(i)$, $x^{(2)}(i)=d^{(0)}(i)$, $x^{(3)}(i)=d^{(0)}(i)$, and $M_{symb}^{layer}=M_{symb}^{(0)}$. In some embodiments, if the number of layers is 4 and the number of codewords is 2, then the codeword to layer mapping is $x^{(0)}(i)=d^{(0)}(i)$, $x^{(1)}(i)=d^{(0)}(i)$, $x^{(2)}(i)=d^{(1)}(i)$, $x^{(3)}(i)=d^{(1)}(i)$, and $M_{symb}^{layer}=M_{symb}^{(0)}=M_{symb}^{(1)}$.

Accordingly, the network device 110 may indicate in the DCI 115 further DMRS ports for network devices 110, 120 transmitting further DMRSs to the terminal device 130. Correspondingly, the terminal device 130 may determine the further DMRS ports from the DCI 115, and receive the further DMRSs on the further DMRS ports from network devices 110, 120. In this way, the reliability of multi-TRP/panel communication would not be limited by the insufficient PTRS ports.

To increase the reliability of multi-TRP/panel communication, another possible solution may be introducing layers with same data. That is a codeword may be mapped to two layers. Accordingly, the network device 110 may transmit same data in a plurality of layers corresponding to the DMRS ports, and transmit PTRSs on respective PTRS ports for the plurality of layers. Correspondingly, the terminal device 130 may receive same data in the plurality of layers corresponding to the DMRS ports, receive the PTRSs on respective PTRS ports for the plurality of layers, perform phase compensation on the data received in each of the plurality of layers based on a respective PTRS, and combine the compensated data received in the plurality of layers.

Taking two layers for example, the two layers may be configured with two TCI states and/or two PTRS may be needed. Same data may be transmitted by the two layers, and the terminal device 130 compensates phase noise with two separate PTRS ports for the two layers, and then combines the compensated data. Therefore, higher reliability of multi-TRP/panel communication is achieved.

In some embodiments involving a PTRS, according to the properties of the DMRSs transmitted on different DMRS ports, limitation of the number of layers may be performed for multi-TRP/panel communication. In this regard, the network device 110 may transmit a PTRS, and restrict the number of the DMRS ports for transmitting the DMRSs to a predetermined number. Correspondingly, at the receiving side, in response to receiving a PTRS, the terminal device 130 may determine that the number of the DMRS ports for transmitting the DMRSs is restricted to a predetermined number.

To be more specific, if a PTRS is needed when multiple TRP/panels are configured. Based on the 3GPP specifications, DMRS can only be configured with up to 4 layers for DMRS type 1, and up to 6 layers for DMRS type 2. If two codewords are needed for multiple TRP/panels, only 5 layers and/or 6 layers for DMRSs of DMRS type 2 can be used for multi-TRP/panel communication. This means that the overhead for communication related to DMRSs can be reduced.

Figure 5:
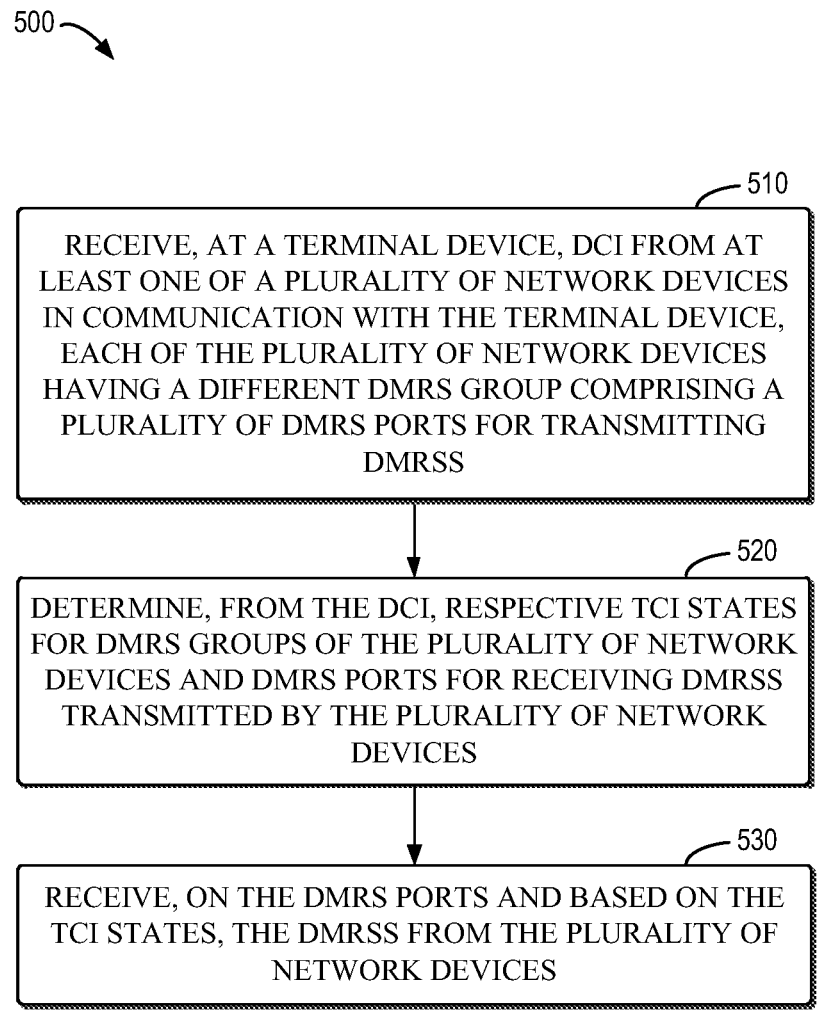
FIG. 5 shows a flowchart of an example method in accordance with some embodiments of the present disclosure.

FIG. 5 shows a flowchart of an example method 500 in accordance with some embodiments of the present disclosure. The method 500 can be implemented by a terminal device, such as the terminal device 130 as shown in FIG. 1. For ease of illustration, example embodiments of the method 500 will be described with reference to FIG. 1.

At block 510, the terminal device 130 receives DCI from at least one of a plurality of network devices in communication with the terminal device 130. Each of the plurality of network devices having a different DMRS group comprising a plurality of DMRS ports for transmitting DMRSs. At block 520, the terminal device 130 determines, from the DCI, respective TCI states for DMRS groups of the plurality of network devices and DMRS ports for receiving DMRSs transmitted by the plurality of network devices. At block 530, the terminal device 130 receives, on the DMRS ports and based on the TCI states, the DMRSs from the plurality of network devices.

In some embodiments, the DMRS ports in each of the DMRS groups may be quasi co-located with each other. In some embodiments, in determining the TCI states, the terminal device 130 may determine a first TCI state for a first DMRS group of the DMRS groups, and determine whether a second TCI state for a second DMRS group of the DMRS groups is identical to the first TCI state. In some embodiments, in response to determining that the second TCI state is different from the first TCI state, the terminal device 130 may determine the second TCI state and the DMRS ports based on a single indication in the DCI.

In some embodiments, in determining the TCI states, the terminal device 130 may obtain a first bitmap and a second bitmap from the DCI. The first bitmap may have more bits than the second bitmap. The terminal device 130 may determine a first TCI state for a first DMRS group of the DMRS groups based on a value of the first bitmap. In response to the second bitmap having a predetermined value, the terminal device 130 may determine that a second TCI state for a second DMRS group of the DMRS groups is identical to the first TCI state. In response to the second bitmap having a value different from the predetermined value, the terminal device 130 may determine the second TCI state based on the value.

In some embodiments, the terminal device 130 may determine further DMRS ports from the DCI, and receive further DMRSs on the further DMRS ports from the plurality of network devices.

In some embodiments, the terminal device 130 may receive same data in a plurality of layers corresponding to the DMRS ports, receive phase tracking reference signals (PTRS) on respective PTRS ports for the plurality of layers, perform phase compensation on the data received in each of the plurality of layers based on a respective PTRS, and combine the compensated data received in the plurality of layers.

In some embodiments, in response to receiving a PTRS, the terminal device 130 may determine that a number of the DMRS ports for transmitting the DMRSs is restricted to a predetermined number.

Figure 6:
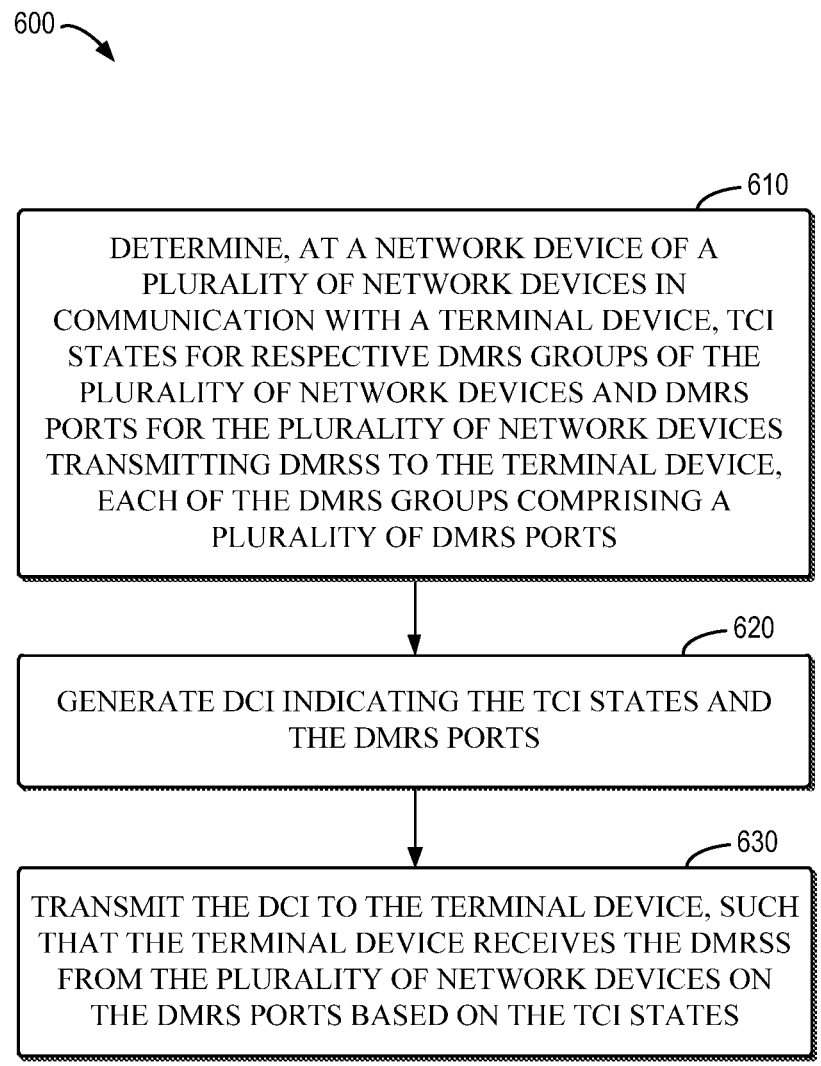
FIG. 6 shows a flowchart of another example method in accordance with some embodiments of the present disclosure.

FIG. 6 shows a flowchart of another example method 600 in accordance with some embodiments of the present disclosure. The method 600 can be implemented by a network device, such as the network device 110 as shown in FIG. 1. For ease of illustration, example embodiments of the method 600 will be described with reference to FIG. 1.

At block 610, the network device 110 determines TCI states for respective DMRS groups of a plurality of network devices comprising the network device 110 in communication with a terminal device, and DMRS ports for the plurality of network devices transmitting DMRSs to the terminal device. Each of the DMRS groups comprises a plurality of DMRS ports. At block 620, the network device 110 generates DCI indicating the TCI states and the DMRS ports. At block 630, the network device 110 transmits the DCI to the terminal device, such that the terminal device receives the DMRSs from the plurality of network devices on the DMRS ports based on the TCI states.

In some embodiments, the DMRS ports in each of the DMRS groups may be quasi co-located with each other. In some embodiments, in generating the DCI, the network device 110 may indicate in the DCI a first TCI state for a first DMRS group of the DMRS groups, and indicate in the DCI whether a second TCI state for a second DMRS group of the DMRS groups is identical to the first TCI state. In some embodiments, in response to indicating in the DCI that the second TCI state is different from the first TCI state, the network device 110 may indicate in the DCI the second TCI state and the DMRS ports using a single indication.

In some embodiments, in generating the DCI, the network device 110 may set a first bitmap and a second bitmap in the DCI. The first bitmap may have more bits than the second bitmap. The network device 110 may indicate a first TCI state for a first DMRS group of the DMRS groups, using a value of the first bitmap, indicate that a second TCI state for a second DMRS group of the DMRS groups is identical to the first TCI state, using a predetermined value of the second bitmap, and indicate the second TCI state, using a value of the second bitmap different from the predetermined value.

In some embodiments, the network device 110 may divide potential TCI states for the DMRS groups into different groups of TCI states, select from the potential TCI states a first TCI state for a first DMRS group of the DMRS groups, and select from a group different from the group comprising the first TCI state a second TCI state for a second DMRS group of the DMRS groups.

In some embodiments, the network device 110 may map a codeword to a spatial layer related to DMRS ports in one DMRS group of the DMRS groups. In some embodiments, the network device 110 may indicate in the DCI further DMRS ports for the plurality of network devices transmitting further DMRSs to the terminal device.

In some embodiments, the network device 110 may transmit same data in a plurality of layers corresponding to the DMRS ports, and transmit PTRSs on respective PTRS ports for the plurality of layers. In some embodiments, the network device 110 may transmit a PTRS, and restrict a number of the DMRS ports for transmitting the DMRSs to a predetermined number.

Figure 7:
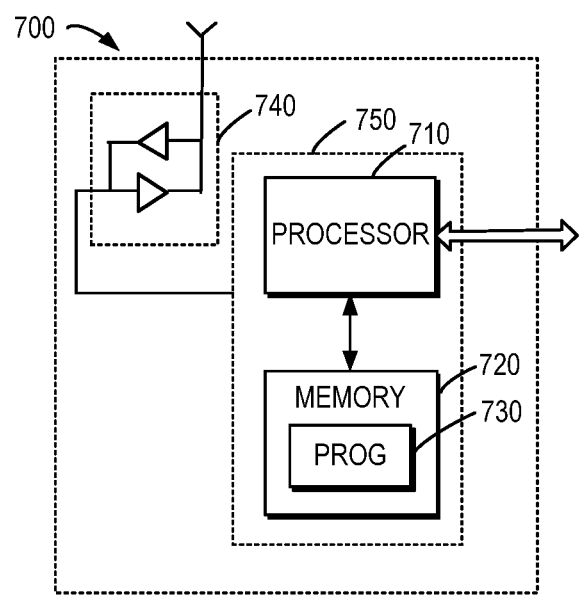
FIG. 7 is a simplified block diagram of a device that is suitable for implementing some embodiments of the present disclosure.

FIG. 7 is a simplified block diagram of a device 700 that is suitable for implementing some embodiments of the present disclosure. The device 700 can be considered as a further example embodiment of the network devices 110, 120 or the terminal device 130 as shown in FIG. 1. Accordingly, the device 700 can be implemented at or as at least a part of the network devices 110, 120 or the terminal device 130.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 720 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIG. 5 or 6. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 720 may form processing means 750 adapted to implement various embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 5 and 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment.

Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for communication of a terminal device, the method comprising:
   receiving, from a network device, downlink control information (DCI) comprising an indication of two transmission configuration indication (TCI) states, each corresponding to a demodulation reference signal (DMRS) code division multiplexing (CDM) group; and
   determining one or more DMRS antenna ports for receiving DMRSs, wherein the determining comprises:
      determining the one or more DMRS antenna ports based on the DCI and a first table corresponding to a number of DMRS CDM group(s) without data, if the DCI corresponds to the two TCI states; and
      determining the one or more DMRS antenna ports based on the DCI and a second table, different from the first table, corresponding to a number of DMRS CDM group(s) without data, if the DCI corresponds to only one TCI state.

2. The method of claim 1, wherein each DMRS CDM group of a plurality of DMRS CMD groups comprises a plurality of DMRS antenna ports which are quasi co-located with each other.

3. The method of claim 1, further comprising:
   determining, from the DCI, a first TCI state for a first DMRS CDM group; and
   determining, from the DCI, whether a second TCI state for a second DMRS CDM group is identical to the first TCI state.

4. The method of claim 3, further comprising:
   determining, from the DCI, that the second TCI state is different from the first TCI state, and
   determining the second TCI state and the one or more DMRS antenna ports based on a single indication in the DCI.

5. The method of claim 1, further comprising:
   obtaining a first bitmap and a second bitmap from the DCI, the first bitmap having more bits than the second bitmap;
   determining a first TCI state for a first DMRS CDM group based on a value of the first bitmap;
   in a case in which a value of the second bitmap is the same as the value of the first bitmap, determining that a second TCI state for a second DMRS CDM group is identical to the first TCI state; and
   in a case in which the value of the second bitmap is different from the value of the first bitmap, determining the second TCI state based on the value of the second bitmap.

6. The method of claim 1, further comprising:
   determining, from the DCI, one or more further DMRS antenna ports for receiving DMRSs; and
   receiving DMRSs on the one or more further DMRS antenna ports from the plurality of network devices.

7. The method of claim 1, further comprising:
   receiving a same data in each of a plurality of layers corresponding to the one or more DMRS antenna ports;
   receiving phase tracking reference signals (PTRS) on respective PTRS antenna ports for the plurality of layers;
   performing phase compensation on the same data received in each of the plurality of layers based on a respective PTRS, thereby obtaining compensated data corresponding to each of the plurality of layers; and
   combining the compensated data corresponding to each of the plurality of layers.

8. The method of claim 1, further comprising:
   in response to receiving a phase tracking reference signal (PTRS), determining that one or more DMRS antenna ports for transmitting the DMRSs are restricted to a number of DMRS antenna ports.

9. The method of claim 1, wherein the generating the DCI further comprises:
   setting a first bitmap and a second bitmap in the DCI, the first bitmap having more bits than the second bitmap;
   indicating a first TCI state for a first DMRS CDM group, using a value of the first bitmap;
   indicating a second TCI state for a second DMRS CDM group comprising one of:
      indicating that the second TCI state is identical to the first TCI state, using a value of the second bitmap, and
      indicating the second TCI state using a value of the second bitmap different from the a value of the first bitmap.

10. A method for communication of a network device, the method comprising:
    determining two transmission configuration indication (TCI) states, each corresponding to a demodulation reference signal (DMRS) code division multiplexing (CDM) group;
    generating downlink control information (DCI) comprising an indication of the two TCI states;
    determining one or more DMRS antenna ports for transmitting DMRSs to a terminal device, wherein the determining comprises:
       determining the one or more antenna ports based on to a number of DMRS CDM group(s) without data, based on the DCI corresponding to the two TCI states,
       wherein the first table is different from a second table, corresponding to a number of DMRS CDM group(s) without data, the second table used when the DCI corresponds to only one TCI state; and
    transmitting the DCI to the terminal device such that the terminal device receives the DMRSs from the network device on the one or more DMRS antenna ports.

11. The method of claim 10, wherein each DMRS CDM group of the plurality of DMRS CDM groups comprises a plurality of DMRS antenna ports which are quasi co-located with each other.

12. The method of claim 10, wherein the generating the DCI comprises:
    indicating, in the DCI, a first TCI state for a first DMRS CDM group; and
    indicating, in the DCI, whether a second TCI state for a second DMRS CDM group is identical to the first TCI state.

13. The method of claim 12, wherein the generating the DCI further comprises:
    indicating, in the DCI, that the second TCI state is different from the first TCI state, and indicating both the second TCI state and the one or more DMRS ports using a single indication in the DCI.

14. The method of claim 10, further comprising:
dividing potential TCI states for a plurality of DMRS CDM groups into groups of TCI states;
selecting, from the potential TCI states, a first TCI state for a first DMRS CDM group; and
selecting, from a group different from the group comprising the first TCI state, a second TCI state for a second DMRS CDM group.

15. The method of claim 10, further comprising:
mapping a codeword to a spatial layer related to DMRS antenna ports in one DMRS CDM group.

16. The method of claim 10, further comprising:
indicating, in the DCI, further DMRS antenna ports for the plurality of network devices transmitting further DMRSs to the terminal device.

17. The method of claim 10, further comprising:
transmitting a same data in each of a plurality of layers corresponding to the one or more DMRS antenna ports; and
transmitting phase tracking reference signals (PTRS) on respective PTRS antenna ports for the plurality of layers.

18. The method of claim 10, further comprising:
transmitting a phase tracking reference signal (PTRS); and
restricting one or more the DMRS antenna ports for transmitting the DMRSs to a number of DMRS antenna ports.

19. A terminal device comprising:
at least one memory storing instructions thereon; and
at least one processor configured to execute the instructions and thereby cause the terminal device to:
receive, from a network device, downlink control information (DCI) comprising an indication of two transmission configuration indication (TCI) states, each corresponding to a demodulation reference signal (DMRS) code division multiplexing (CDM) group, and
determine one or more DMRS antenna ports for receiving DMRSs, wherein determining comprises:
determining the one or more DMRS antenna ports based on the DCI and a first table corresponding to a number of DMRS CDM group(s) without data, if the DCI corresponds to the two TCI states; and
determining the one or more DMRS antenna ports based on the DCI and a second table, different from the first table, corresponding to a number of DMRS CDM group(s) without data, if the DCI corresponds to only one TCI state.

20. The terminal device of claim 19, wherein the one or more DMRS antenna ports are quasi co-located with each other.

* * * * *